(12) United States Patent
Shimono et al.

(10) Patent No.: US 9,266,986 B2
(45) Date of Patent: Feb. 23, 2016

(54) CHLOROTRIFLUOROETHYLENE COPOLYMER

(75) Inventors: Takeshi Shimono, Settsu (JP); Takahisa Aoyama, Settsu (JP); Hiroshi Torimae, Settsu (JP); Takahiro Kitahara, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 11/578,066

(22) PCT Filed: Apr. 13, 2005

(86) PCT No.: PCT/JP2005/007133
§ 371 (c)(1),
(2), (4) Date: Oct. 12, 2006

(87) PCT Pub. No.: WO2005/100420
PCT Pub. Date: Oct. 27, 2005

(65) Prior Publication Data
US 2007/0219333 A1  Sep. 20, 2007

(30) Foreign Application Priority Data
Apr. 13, 2004 (JP) .................. 2004-118365

(51) Int. Cl.
*C08F 214/24* (2006.01)
*C08F 214/26* (2006.01)

(52) U.S. Cl.
CPC ........... *C08F 214/24* (2013.01); *C08F 214/242* (2013.01); *C08F 214/245* (2013.01); *C08F 214/26* (2013.01); *C08F 214/262* (2013.01); *C08F 214/265* (2013.01)

(58) Field of Classification Search
CPC .. C08F 214/24; C08F 214/26; C08F 214/242; C08F 214/245; C08F 214/262; C08F 214/265
USPC .......................................... 526/242, 247, 249
See application file for complete search history.

(56) References Cited

U.S. PATENT DOCUMENTS

| | | | |
|---|---|---|---|
| 2,915,509 A * | 12/1959 | Honn .................... | C08F 214/24 |
| | | | 526/229 |
| 3,053,818 A * | 9/1962 | Honn et al. .................... | 526/227 |
| 3,331,811 A | 7/1967 | Schafer | |
| 3,355,347 A | 11/1967 | Habermann | |
| 4,743,658 A | 5/1988 | Imbalzano et al. | |
| 6,089,278 A | 7/2000 | Nishino et al. | |
| 6,177,196 B1 | 1/2001 | Brothers et al. | |
| 6,355,321 B1 | 3/2002 | Nishino et al. | |
| 6,655,414 B2 | 12/2003 | Nishi et al. | |
| 6,656,553 B2 | 12/2003 | Nishi et al. | |
| 6,679,297 B1 | 1/2004 | Nishi et al. | |
| 6,680,124 B1 | 1/2004 | Araki et al. | |
| 6,696,526 B1 | 2/2004 | Kaulbach et al. | |
| 6,706,351 B2 | 3/2004 | Abusleme et al. | |
| 6,706,794 B1 * | 3/2004 | Tsuda et al. .................... | 524/430 |
| 6,740,375 B1 | 5/2004 | Sagisaka et al. | |
| 6,881,460 B2 | 4/2005 | Inaba et al. | |
| 6,893,729 B2 | 5/2005 | Inaba et al. | |
| 7,078,470 B2 | 7/2006 | Funaki et al. | |
| 2002/0010277 A1 | 1/2002 | Kaulbach et al. | |
| 2002/0119319 A1 | 8/2002 | Funaki et al. | |
| 2003/0068499 A1 | 4/2003 | Abusleme et al. | |
| 2003/0121560 A1 | 7/2003 | Morohashi et al. | |
| 2003/0198770 A1 | 10/2003 | Fukushi et al. | |
| 2004/0001956 A1 | 1/2004 | Funaki et al. | |
| 2005/0020792 A1 | 1/2005 | Aoyama et al. | |
| 2007/0026177 A1 | 2/2007 | Kitahara et al. | |
| 2007/0166497 A1 | 7/2007 | Shimono et al. | |

FOREIGN PATENT DOCUMENTS

| | | |
|---|---|---|
| CN | 1477133 A | 2/2004 |
| DE | 198 05 832 A1 | 8/1999 |
| EP | 1223030 A2 | 7/2002 |
| EP | 1 375 539 A1 | 1/2004 |
| EP | 1531164 A2 | 5/2005 |
| EP | 1 627 731 A1 | 2/2006 |
| JP | 48-25415 B1 | 7/1973 |
| JP | 54-132691 A | 10/1979 |
| JP | 60-88078 | 5/1985 |
| JP | 63-307609 A | 12/1988 |
| JP | 3-287614 | 12/1991 |
| JP | 4-83 B2 | 1/1992 |
| JP | 9137900 A | 5/1997 |
| JP | 11207840 A | 8/1999 |
| JP | 2000-7732 | 1/2000 |
| JP | 2000291849 A | 10/2000 |
| JP | 2001088816 A | 4/2001 |
| JP | - 2002-503744 | 2/2002 |
| JP | 2002144499 A | 5/2002 |
| JP | 2002210892 A | 7/2002 |
| JP | 2002213655 A | 7/2002 |
| JP | 2002267054 A | 9/2002 |
| JP | 2002307624 A | 10/2002 |
| JP | 2002327018 A | 11/2002 |
| JP | 2002357285 A | 12/2002 |
| JP | 2003311764 A | 11/2003 |
| JP | 2004-277689 A | 10/2004 |
| JP | 2004358959 A | 12/2004 |
| KR | 100303858 B1 | 11/2001 |
| WO | 9900249 A1 | 1/1999 |
| WO | 9945044 A1 | 9/1999 |
| WO | 0118142 A1 | 3/2001 |
| WO | 0123795 A1 | 4/2001 |
| WO | 0158686 A1 | 8/2001 |
| WO | 0160606 A1 | 8/2001 |
| WO | 03048214 A1 | 6/2003 |
| WO | WO 2004/098880 A1 | 11/2004 |

OTHER PUBLICATIONS

Chemical Abstracts, vol. 66, May 12, 1984, Abstract No. 38567, Habermann, Kenneth R.:, "Laminated Polymer Sheets", & BE 670586, (Allied Chemical Corp.).

* cited by examiner

*Primary Examiner* — Nicole M Buie-Hatcher
(74) *Attorney, Agent, or Firm* — Sughrue Mion, PLLC

(57) ABSTRACT

The present invention provides a chlorotrifluoroethylene copolymer endowed with stress cracking resistance, chemical resistance and thermal stability. The present invention is a chlorotrifluoroethylene copolymer constituted of chlorotrifluoroethylene unit, tetrafluoroethylene unit and a monomer [A] unit derived from a monomer [A] copolymerizable with chlorotrifluoroethylene and tetrafluoroethylene, wherein the sum of chlorotrifluoroethylene unit and the tetrafluoroethylene unit amounts to 90 to 99.9 mole percent and the monomer [A] unit amounts to 0.1 to 10 mole percent.

8 Claims, 1 Drawing Sheet

CHLOROTRIFLUOROETHYLENE COPOLYMER

TECHNICAL FIELD

The present invention relates to a chlorotrifluoroethylene copolymer and a molded article made therefrom.

BACKGROUND ART

Polychlorotrifluoroethylene [PCTFE] is known to have good gas barrier properties and low water vapor permeability. However, it has problems; it is insufficient in stress cracking resistance, thermal stability and chemical resistance and the temperature range within which it can be molded is narrow.

Attempts have been made to provide PCTFE with stress cracking resistance by copolymerizing chlorotrifluoroethylene [CTFE] with various modifier monomers. For example, CTFE/PAVE copolymers resulting from copolymerization of 0.01 to 1 mole percent of a perfluoro(alkyl vinyl ether) [PAVE] have been disclosed (cf. e.g. Patent Document 1: Japanese Kokai (Laid-open) Publication H03-287614).

These CTFE/PAVE copolymers have improved stress cracking resistance but are still insufficient in thermal stability. This is because their thermal decomposition temperature is not so high, so that, for example, in the case of coextrusion molding with a partner material having a high melting point, it is to be exposed to severe molding conditions and thus the partner materials that can be used in combination are unfavorably restricted.

Further, fluoroelastomers having a copolymerization composition comprising 30 to 60 mole percent of vinylidene fluoride, 10 to 40 mole percent of tetrafluoroethylene [TFE] and 10 to 30 mole percent of CTFE, optionally together with 5 to 15 mole percent of perfluoro(methyl vinyl ether) (cf. e.g. Patent Document 2: Japanese Kokai Publication 2000-7732) and hydroxyl group-containing fluorocopolymers resulting from polymerization of (a) TFE and/or CTFE, (b) a vinyl ether type monomer and (c) a hydroxyl group-containing vinyl ether type monomer in the proportion such that the ratio a/(b+c) amounts to about 40 to 60 mole percent (cf. e.g. Patent Document 3: Japanese Kokai Publication S60-88078), among others, have been proposed as CTFE copolymers. However, these CTFE copolymers still have a problem; namely, they are inferior in chemical resistance and thermal stability.

Other fluoropolymers have also been proposed as CTFE copolymers. They have a copolymerization composition comprising 50 to 99.8 mole percent of TFE and/or CTFE, 0.1 to 49.99 mole percent of a fluoromonomer other than TFE and CTFE and 0.01 to 5 mole percent of at least one compound selected from among itaconic acid, citraconic acid, and anhydrides thereof (cf. e.g. Patent Document 4: Laid-open European Patent Application No. 1375539). This fluoropolymer needs to have such compounds as itaconic acid as a copolymerization composition for improving adhesion strength. However, there is no specific disclosure about fluoropolymers containing both TFE and CTFE in the copolymerization composition thereof.

DISCLOSURE OF INVENTION

Problems Which the Invention is to Solve

It is an object of the present invention to provide a chlorotrifluoroethylene copolymer endowed with stress cracking resistance, chemical resistance and thermal stability.

Means for Solving the Problems

The present invention is a chlorotrifluoroethylene copolymer constituted of chlorotrifluoroethylene unit, tetrafluoroethylene unit and a monomer [A] unit derived from a monomer [A] copolymerizable with chlorotrifluoroethylene and tetrafluoroethylene, wherein the sum of chlorotrifluoroethylene unit and the tetrafluoroethylene unit amounts to 90 to 99.9 mole percent and the monomer [A] unit amounts to 0.1 to 10 mole percent.

The present invention is a molded article obtained by using the chlorotrifluoroethylene copolymer.

In the following, the invention is described in detail.

The chlorotrifluoroethylene copolymer (hereinafter referred to as "CTFE copolymer") is constituted of chlorotrifluoroethylene unit [CTFE unit], tetrafluoroethylene unit [TFE unit] and a monomer [A] unit derived from a monomer [A] copolymerizable with chlorotrifluoroethylene [CTFE] and tetrafluoroethylene [TFE].

The "CTFE unit" and "TFE unit" so referred to herein are respectively the segment [—CFCL—CF$_2$—] and derived from chlorotrifluoroethylene and the segment [—CF$_2$—CF$_2$—] derived from tetrafluoroethylene from the viewpoint of the molecular structure of the CTFE copolymer. Similarly, each "monomer [A] unit" is the segment resulting from addition of the viewpoint of the monomer [A] from the molecular structure of the CTFE copolymer.

The monomer [A] is not particularly restricted but may be any monomer copolymerizable with CTFE and TFE. It may comprise one single species or two or more species. It includes ethylene [Et], vinylidene fluoride [VdF], a perfluoro (alkyl vinyl ether) [PAVE], a vinyl monomer represented by the general formula (I):

$$CX^3X^3\!=\!CX^1(CF_2)_n\!-\!X^2 \qquad (I)$$

(wherein $X^1$, $X^3$ and $X^4$ are the same or different and each represents hydrogen atom or fluorine atom, $X^2$ represents hydrogen atom, fluorine atom or chlorine atom and n represents an integer of 1 to 10), and alkyl perfluorovinyl ether derivatives represented by the general formula (III):

$$CF_2\!=\!CF\!-\!OCH_2\!-\!Rf \qquad (III)$$

(wherein Rf is a perfluoroalkyl group containing 1 to 5 carbon atoms), among others.

The monomer [A] preferably comprises at least one species selected from the group consisting of Et, VdF, PAVE and vinyl monomer represented by the general formula (I).

The monomer [A] may comprise one single species or a combination of two or more species each of the genera PAVE, vinyl monomer of general formula (I) and/or alkyl perfluorovinyl ether derivative of general formula (III).

The vinyl monomer represented by the general formula (I) is not particularly restricted but includes, among others, hexafluoropropylene [HFP], perfluoro(1,1,2-trihydro-1-hexene), perfluoro(1,1,5-trihydro-1-pentene) and a perfluoro (alkyl)ethylene represented by the general formula (IV):

$$H_2C\!=\!CX^5Rf^5 \qquad (IV)$$

(wherein $X^5$ is H, F or $CF_3$ and $Rf^5$ is a perfluoroalkyl group containing 1 to 10 carbon atoms).

Preferred as the perfluoro(alkyl)ethylene is perfluoro(butyl)ethylene.

Preferred as the alkyl perfluorovinyl ether derivative represented by the general formula (III) are those in which Rf is a perfluoroalkyl group containing 1 to 3 carbon atoms. $CF_2\!=\!CF\!-\!OCH_2\!-\!CF_2CF_3$ is more preferred.

The PAVE is more preferably a perfluoro(alkyl vinyl ether) represented by the general formula (II):

$$CF_2=CF-ORf^1 \qquad (II)$$

(wherein $Rf^1$ represents a perfluoroalkyl group containing 1 to 8 carbon atoms). As the perfluoro(alkyl vinyl ether) represented by the general formula (II), there may be mentioned perfluoro(methyl vinyl ether), perfluoro(ethyl vinyl ether), perfluoro(propyl vinyl ether) and perfluoro(butyl vinyl ether), among others, and perfluoro(methyl vinyl ether), perfluoro (ethyl vinyl ether) and perfluoro(propyl vinyl ether) are more preferred.

In the art, CTFE and vinyl ethers are regarded as poor in copolymerizability. However, the development of the CTFE copolymer of the invention has made it possible to copolymerize a relatively high percentage of a PAVE and/or a fluorine-free vinyl ether by additionally copolymerizing TFE.

Also usable as the monomer [A] is an unsaturated carboxylic acid copolymerizable with CTFE and TFE.

The unsaturated carboxylic acid is not particularly restricted but includes unsaturated aliphatic carboxylic acid containing 3 to 6 carbon atoms, including unsaturated aliphatic polycarboxylic acid containing 3 to 6 carbon atoms.

The unsaturated polycarboxylic acid is not particularly restricted but include, among others, maleic acid, itaconic acid, citraconic acids, and an acid anhydride derived from these.

While the monomer [A] may comprise two or more species, the combined use of itaconic acid, citraconic acid, and/or the anhydride thereof may not be necessary when one of the species comprises VdF, PAVE and/or HFP.

The CTFE copolymer of the invention is the product obtained by using TFE as an essential monomer and, further, causing the monomer [A], in such a specific proportion as described later herein, to be involved in addition and, as a result, can be improved in thermal stability, moldability, stress cracking resistance and chemical resistance.

The CTFE copolymer has not only those gas barrier properties and low water vapor permeability which are known in the art to be characteristic of polychlorotrifluoroethylene [PCTFE] but also low permeability to liquids such as liquid chemicals which is not known in the art as a property of PCTFE.

In the CTFE copolymer of the invention, the monomer [A] unit amounts to 0.1 to 10 mole percent, and the sum of CTFE unit and TFE unit amounts to 90 to 99.9 mole percent. At the monomer [A] unit content is less than 0.1 mole percent, the resulting copolymer tends to be inferior in moldability, environmental stress cracking resistance and stress cracking resistance and, exceeding 10 mole percent, the copolymer tends to be inferior in low chemical liquid permeability, thermal stability, mechanical characteristics, productivity and so forth.

When the monomer [A] is a PAVE, a more preferred lower limit to the monomer [A] unit content is 0.5 mole percent, a more preferred upper limit thereto is 5 mole percent and a still more preferred upper limit thereto is 3 mole percent.

The monomer [A] unit content in the CTFE copolymer of the invention is the value obtained by such an analytical technique as $^{19}$F-NMR and, more specifically, is the value obtained by appropriately selecting or combining NMR spectrometry, infrared spectrophotometry [IR], elemental analysis and/or fluorescent X ray analysis according to the monomer species.

The CTFE unit amounts to preferably 10 to 90 mole percent of the sum of the CTFE unit and TFE unit. When the CTFE unit amounts to less than 10 mole percent relative to the sum of the CTFE unit and TFE unit, the liquid chemical permeability may become not so low as desired and, when it is above 90 mole percent, the rate of polymerization markedly lowers and the productivity decreases and, further, the chemical resistance may lower and/or the thermal stability may become insufficient in some instances. A more preferred lower limit thereto is 15 mole percent, a still more preferred lower limit is 20 mole percent, a more preferred upper limit is 80 mole percent, a still more preferred upper limit is 70 mole percent and a particularly preferred upper limit is 55 mole percent.

When a PAVE is used as the monomer [A], the CTFE content relative to the sum of the CTFE unit content and TFE unit content can be selected in a wide range and, more preferably, it may amount to 15 to 90 mole percent, still more preferably 20 to 90 mole percent.

So long as the monomer-derived polymer chain portion of the CTFE copolymer of the invention is constituted of the CTFE unit, TFE unit and monomer [A] unit, one or both of the polymer chain termini may be different in chemical structure from the CTFE unit, TFE unit and monomer [A] unit. The polymer chain terminus or termini is or are not particularly restricted but may be, for example, such an unstable terminus group or groups as described later herein.

When it is to be melt-molded at a molding temperature of 300° C. or above, the CTFE copolymer of the invention preferably contains not more than 80 unstable terminal groups per $10^6$ carbon atoms. When the number of such groups exceeds 80 per $10^6$ carbon atoms, blowing tends to occur in the step of melt molding at a molding temperature of 300° C. or above. A more preferred upper limit is 40, a still more preferred upper limit is 20, and a particularly preferred upper limit is 6. The number of unstable terminal groups may be reduced, within the above range, to 1, for instance, from the detection limit viewpoint.

In the case of melt molding at a molding temperature lower than 300° C., the number of unstable terminal groups preferably exceeds 80 per $10^6$ carbon atoms. When that number is not larger than 80 per $10^6$ carbon atoms in the case of melt molding at a molding temperature below 300° C., the adhesiveness may decrease in certain cases. A more preferred lower limit is 100, a still more preferred lower limit is 150, a particularly preferred lower limit is 180 and a most preferred lower limit is 220. When the number of unstable terminal groups is within the above range in the case of melt molding at a molding temperature lower than 300° C., an upper limit may be set, for example, at 500 from the productivity viewpoint.

The unstable terminal groups are generally formed by addition, to the main chain terminus or termini, of the chain transfer agent or the polymerization initiator used in the step of polymerization and thus are derived from the structure of the chain transfer agent and/or polymerization initiator.

The "unstable terminal groups" so referred to herein include —$CF_2CH_2OH$, —$CONH_2$, —COF, —COOH, —$COOCH_3$, —$CF=CF_2$ and —$CF_2H$. Among such unstable terminal groups, —$CF_2CH_2OH$, —$CONH_2$, —COF, —COOH and —$COOCH_3$ readily exert influences on the adhesiveness and the blowing in the step of melt molding.

The number of unstable terminal groups is the value obtained by carrying out measurements using an infrared spectrophotometer [IR]. More specifically, the number of unstable terminal groups is the number obtained by compression molding the CTFE copolymer in a powder form at a molding temperature higher by 50° C. than the melting point thereof and at a molding pressure of 5 MPa, subjecting the thus-obtained film sheet with a thickness of 0.25 to 0.30 mm to infrared absorption spectrometry, determining the species by comparison with infrared absorption spectra for known films and making a calculation based on the differential spectrum thereof according to the following formula:

$$\text{Number of terminal groups (per } 10^6 \text{ carbon atoms)} = (1 \times K)/t$$

where:
l: Absorbance
K: Correction factor
t: Film thickness (mm)

The correction factors for the terminal groups in question are shown in Table 1.

TABLE 1

| Terminal group | Absorption frequency (cm$^{-1}$) | Correction factor |
| --- | --- | --- |
| —COF | 1884 | 405 |
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction factors given in Table 1 are the values determined from infrared absorption spectra of model compounds for calculating the number of corresponding terminal groups per 10$^6$ carbon atoms.

In the case of melt molding or heat treatment at a temperature lower than 300° C., the CTFE copolymer of the invention preferably contains an adhesive functional group or groups. The term "adhesive functional group" as used herein means a group which constitutes a part of the molecular structure of a polymer contained in the CTFE copolymer and is capable of participating in the adhesion between the CTFE copolymer and a substrate. The adhesive functional group may be any moiety capable of being involved in such adhesion and includes, within the meaning thereof, those generally called functional groups but also those generally called bonds such as ether bonding.

The adhesive functional group is not particularly restricted but may be any of those capable of being involved in fluororesin-substrate adhesion, including carbonyl, hydroxyl and amino groups, among others. The "carbonyl group" so referred to herein is a divalent carbon-containing group comprising a carbon-oxygen double bond, typically the group represented by —C(=O)—. The carbonyl group is not particularly restricted but may be, for example, a carbonate group, haloformyl group, formyl group, carboxyl group, ester bond [—C(=O)O—], acid anhydride bond [—C(=O)O—C(=O)—], isocyanato group, amide group, imide group [—C(=O)—NH—C(=O)—], urethane bond [—NH—C(=O)O—], carbamoyl group [NH$_2$—C(=O)—], carbamoyloxy group [NH$_2$—C(=O)O—], ureido group [NH$_2$—C(=O)—NH—] or oxamoyl group [NH$_2$—C(=O)—C(=O)—], or the like one constituting a part of the chemical structure.

The above-mentioned carbonate group is represented by —OC(=O)O—R$^1$ (in which R$^1$ represents an organic group). As the organic group R$^1$ in the above formula, there may be mentioned, for example, alkyl groups containing 1 to 20 carbon atoms, ether bond-containing alkyl groups containing 2 to 20 carbon atoms, etc.; among them, alkyl groups containing 1 to 8 carbons, ether bond-containing alkyl groups containing 2 to 4 carbon atoms and the like are preferred. For example, —OC(=O)OCH$_3$, —OC(=O)OC$_3$H$_7$, —OC(=O)OC$_8$H$_{17}$, —OC(=O)OCH$_2$CH$_2$CH$_2$OCH$_2$CH$_3$ and the like may be mentioned as preferred examples.

The amide group mentioned above is a group represented by the general formula:

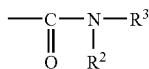

(wherein R$^2$ represents hydrogen atom or an organic group and R$^3$ represents an organic group)

The hydrogen atom or atoms each bound the nitrogen atom in the above-mentioned amide group, imide group, urethane bond, carbamoyl group, carbamoyloxy group, ureido group or oxamoyl group, for instance, each may be substituted by a hydrocarbon group such as an alkyl group.

Preferred as the adhesive functional group are amide, carbamoyl, hydroxyl, carboxyl and carbonate groups since these are easy to introduce and the coatings obtained show proper thermal stability and good adhesion at relatively low temperatures; among them, carbonate groups are preferred.

When the CTFE copolymer is an adhesive functional group-containing one, the copolymer may comprise a polymer containing an adhesive functional group or groups at one or each main chain terminus or on one or more side chains or a polymer containing such groups at one or each main chain terminus and in one or more side chains. When the polymer main chain is an adhesive functional group-terminated one, each of the both termini of the main chain may have such group, or only either one of the termini may have such group. When the CTFE copolymer contains such an adhesive functional group or groups as mentioned above at one or each main chain terminus and/or in a side chain(s) and/or contains an adhesive functional group or groups each in the structural form generally called a bond such as an ether bond, such adhesive functional group or groups may be contained in the main chain. That the CTFE copolymer comprises a polymer whose main chain is an adhesive functional group-terminated one is preferred for the reason that such group or groups will not markedly lower the mechanical characteristics or chemical resistance of the copolymer and for reasons of advantageousness from the productivity and cost viewpoint.

The CTFE copolymer which comprises a polymer having adhesive functional group-containing side chains can be obtained by copolymerizing an adhesive functional group-containing monomer with a fluoromonomer and/or a fluorine-free monomer, with each monomer species and the monomer composition being selected according to the desired fluororesin. The term "adhesive functional group-containing monomer" as used herein means a monomer containing an adhesive functional group. The adhesive functional group-containing monomer may or may not contain a fluorine atom(s). Since, however, the above-mentioned fluoromonomer and fluorine-free monomer have no adhesive functional group and, in this respect, are conceptually distinguished from the adhesive functional group-containing monomer which has an adhesive functional group.

Preferred as the adhesive functional group-containing monomer are unsaturated compounds represented by the general formula (IV):

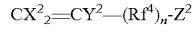

(wherein Z$^2$ represents a hydroxyl, carbonyl or amino group-containing functional group, X$^2$ and y$^2$ are the same or different and each represents hydrogen atom or fluorine atom, Rf$^4$ represents an alkylene group containing 1 to 40 carbon atoms, a fluorine-containing oxyalkylene group containing 1 to 40 carbon atoms, an ether bond-containing fluoroalkylene group containing 1 to 40 carbon atoms or an ether bond-containing, fluorine-containing oxyalkylene group containing 1 to 40 carbon atoms and n represents 0 or 1). By saying "hydroxyl, carbonyl or amino group-containing functional group" herein, it is meant that the functional group in question may be a hydroxyl group or a carbonyl group or an amino group or a functional group containing any of these adhesive functional groups.

The adhesive functional group-containing monomer may also be an unsaturated dibasic acid monoester, vinylene carbonate, maleic anhydride or maleic acid, for instance.

The CTFE copolymer, when it comprises a polymer whose main chain is an adhesive functional group-terminated one in which the adhesive functional group is a carbonate group, can be obtained by a method of polymerization using a peroxycarbonate as the polymerization initiator. The use of such method is preferred in view of the fact that the carbonate group introduction and the control of such introduction are very easy to make and also from the economical viewpoint and from the viewpoint of quality, including thermal stability and chemical resistance, among others.

Preferred as the peroxycarbonate are compounds represented by one of the following formulas:

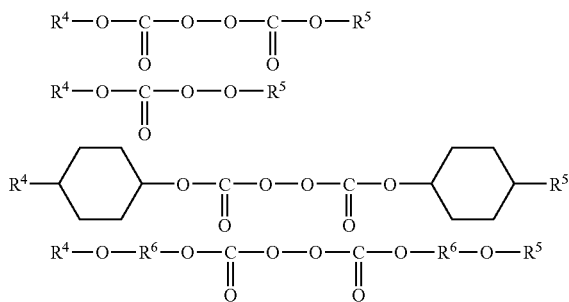

(In the above formulas, $R^4$ and $R^5$ are the same or different and each represents a straight or branched monovalent saturated hydrocarbon group containing 1 to 15 carbon atoms or an alkoxyl group-terminated straight or branched monovalent saturated hydrocarbon group containing 1 to 15 carbon atoms, and $R^6$ represents a straight or branched divalent saturated hydrocarbon group containing 1 to 15 carbon atoms or an alkoxyl group-terminated straight or branched divalent saturated hydrocarbon group containing 1 to 15 carbon atoms.)

Preferred as the peroxycarbonate, among others, are diisopropyl peroxycarbonate, di-n-propyl peroxydicarbonate, tert-butylperoxy isopropyl carbonate, bis(4-tert-butylcyclohexyl)peroxydicarbonate and di-2-ethylhexyl peroxydicarbonate.

When the CTFE copolymer comprises a polymer whose main chain is an adhesive functional group-terminated one in which the adhesive functional group is other than a carbonate group, a peroxide-derived adhesive functional group can be introduced therein, like in the case of the above-mentioned carbonate group introduction, by carrying out the polymerization using such a peroxide as a peroxycarbonate, peroxydicarbonate, peroxy ester or peroxyalcohol as the polymerization initiator. By saying "peroxide-derived", it is meant that the functional group in question is introduced directly from a functional group contained in the peroxide or indirectly by conversion of the functional group introduced directly from the functional group contained in the peroxide.

The level of addition of the polymerization initiator such as a peroxycarbonate or peroxy ester is preferably 0.05 to 20 parts by mass per 100 parts by mass of the polymer to be obtained, although it may vary depending on the kind, composition and molecular weight of the desired fluororesin, the polymerization conditions and the initiator species used, among others. A more preferred lower limit is 0.1 part by mass, and a particularly preferred upper limit is 10 parts by mass.

The method of polymerization for obtaining the above CTFE copolymer is not particularly restricted but includes those polymerization methods known in the art, for example solution polymerization, emulsion polymerization and bulk polymerization. From the industrial viewpoint, however, the suspension polymerization method is preferred which is carried out in an aqueous medium using a fluorine-containing solvent and using a peroxycarbonate or a like polymerization initiator.

In the above suspension polymerization, a fluorine-containing solvent may be used in admixture with water. As the fluorine-containing solvent, there may be mentioned, for example, hydrochlorofluoroalkanes such as $CH_3CClF_2$, $CH_3CCl_2F$, $CF_3CF_2CCl_2H$ and $CF_2ClCF_2CFHCl$; chlorofluoroalkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$. Among them, perfluoroalkanes are preferred. The amount of the fluorine-containing solvent to be used is preferably 10 to 100% by mass relative to water from the suspensibility and economy viewpoint.

The polymerization temperature is not particularly restricted but may be 0 to 100° C. The polymerization pressure may be properly determined according to the solvent species, the amount and vapor pressure thereof, the polymerization temperature and other polymerization conditions; generally, it may be 0 to 9.8 MPaG.

In the polymerization for obtaining the CTFE copolymer, any of the conventional chain transfer agents, including hydrocarbons such as isopentane, n-pentane, n-hexane and cyclohexane; alcohols such as methanol and ethanol; and halogenated hydrocarbons such as carbon tetrachloride, chloroform, methylene chloride and methyl chloride, among others, can be used for controlling the molecular weight. The content of the peroxide-derived terminal carbonate group or like adhesive functional group can be controlled by adjusting the usage of the polymerization initiator such as the peroxycarbonate, the usage of the chain transfer agent, the polymerization temperature and other polymerization conditions.

The CTFE copolymer of the invention is not particularly restricted but includes, among others, CTFE/TFE/HFP copolymer, CTFE/TFE/VdF copolymer, CTFE/TFE/PAVE copolymer, CTFE/TFE/HFP/PAVE copolymer, CTFE/TFE/VdF/PAVE copolymer, CTFE/TFE/Et copolymer, CTFE/TFE/Et/PAVE copolymer and the like; CTFE/TFE/PAVE copolymer is preferred, however.

The CTFE copolymer of the invention may be a polymer constituting either a resin or an elastomer; a resin-constituting one is preferred, however.

The CTFE copolymer of the invention preferably has a melt flow rate [MFR] of 0.1 to 70 (g/10 minutes). When the MFR is within the above range, the copolymer becomes excellent in stress cracking resistance. A more preferred lower limit to the above MFR is 1 (g/10 minutes), and a more preferred upper limit is 50 (g/10 minutes).

The MFR mentioned above is the value obtained by using a melt indexer and measuring the mass of the CTFE copolymer allowed to flow out through a nozzle with an inside diameter of 2 mm and a length of 8 mm at a temperature higher by 70° C. than the melting point under a load of 5 kg over 10 minutes.

The CTFE copolymer of the invention preferably has a melting point [Tm] of 150 to 300° C. A more preferred lower limit is 160° C., a still more preferred lower limit is 170° C., and a more preferred upper limit is 290° C.

The melting point [Tm] is the temperature corresponding to the melting peak as observed upon raising the temperature at a rate of 10° C./minute using a differential scanning calorimeter [DSC].

The CTFE copolymer of the invention, when subjected to a heating test, preferably shows a temperature [Tx] of not lower than 370° C. at which 1% by mass of the CTFE copolymer is decomposed. A more preferred lower limit is 380° C. and a still more preferred lower limit is 390° C. Within the above range, an upper limit to the above-defined thermal decomposition temperature [Tx] may be set at 450° C., for instance.

The thermal decomposition temperature [Tx] is the value obtained by using an apparatus for thermogravimetry/differential thermal analysis [TG-DTA] and measuring the temperature at which the loss in mass of the CTFE copolymer subjected to the heating test amounts to 1% by mass.

The CTFE copolymer of the invention preferably shows a difference [Tx–Tm] of 150° C. or greater between the melting point [Tm] and the temperature [Tx] causing 1% by mass decomposition of the CTFE copolymer. When such difference is smaller than 150° C., the temperature range within which molding is possible becomes so narrow that the range of choice of molding conditions becomes narrow. Because of its broad temperature range within which molding is possible, as mentioned above, the CTFE copolymer mentioned above, when subjected to coextrusion molding, can be coextruded with a high-melting polymer as the counterpart. A more preferred lower limit to the above difference [Tx–Tm] is 170° C. Within the above range, an upper limit to the difference [Tx–Tm] may be set at 210° C., for instance, since the range of choice of molding conditions is sufficiently broad then.

The CTFE copolymer of the invention, when tested in the form of a sheet for measurement, preferably shows a 35% (by mass) hydrochloric acid permeability coefficient of not higher than $2.5 \times 10^{-13}$ (g·cm)/(cm$^2$·sec). A more preferred upper limit to the 35% (by mass) hydrochloric acid permeability coefficient is $1.5 \times 10^{-13}$ (g·cm)/(cm$^2$·sec) and a still more preferred upper limit is $1.0 \times 10^{-13}$ (g·cm)/(cm$^2$·sec). A preferred lower limit to the hydrochloric acid permeability coefficient of the sheet for measurement can be set, within the above range, at $0.001 \times 10^{-13}$ (g·cm)/(cm$^2$·sec), for instance.

The sheet for measurement is a 0.2-mm-thick sheet obtained by compression molding of the CTFE copolymer of the invention at a molding temperature higher by 50° C. than the melting point and at a molding pressure of 5 MPa.

The CTFE copolymer of the invention, when tested in the form of a laminated tube (A) for measurement, preferably shows a ratio [Px/Py] of not higher than 0.7 of the 35% (by mass) hydrochloric acid permeability coefficient [Px] of the tube (A) to the 35% (by mass) hydrochloric acid permeability coefficient [Py] of a monolayer tube (a) for comparison. A more preferred upper limit to the above ratio [Px/Py] is 0.5 and a more preferred upper limit is 0.2. Within the above range, a preferred lower limit to the ratio [Px/Py] may be set at 0.001, for instance.

The laminated tube (A) for measurement is a tube obtained by feeding the CTFE copolymer of the invention as an outer layer-forming polymer, together with a tetrafluoroethylene/perfluoro(propyl vinyl ether) copolymer [PFA] when the CTFE copolymer has a melting point exceeding 210° C., or a tetrafluoroethylene/perfluoro(methyl vinyl ether) copolymer [MFA] when the CTFE copolymer has a melting point not higher than 210° C., as an inner layer-forming polymer, to a multilayer extruder and carrying out multilayer extrusion molding at an inner layer cylinder temperature of 380° C., an outer layer cylinder temperature higher by 75 to 105° C. than the melting point of the CTFE copolymer of the invention and a die temperature of 395° C. when the CTFE copolymer has a melting point exceeding 210° C., or at an inner layer cylinder temperature of 270° C., an outer layer cylinder temperature higher by 75 to 90° C. than the melting point of the CTFE copolymer of the invention and a die temperature of 290° C. when the CTFE copolymer has a melting point not higher than 210° C., at a take-off speed of 0.5 m/minute, with the outer layer thickness amounting to 12.6% of the sum of the outer layer thickness and inner layer thickness. The monolayer tube (a) for comparison is a tube obtained by using a tetrafluroethylene/perfluoro(alkyl vinyl ether) copolymer under the same conditions as employed in preparing the laminated tube (A) for measurement except that the CTFE copolymer of the invention is not used; it is equal in thickness to the laminated tube for measurement.

The CTFE copolymer of the invention, when tested in the form of a tube (B) for measurement, preferably shows a ratio [Pz/Py] of not higher than 0.7 of the 35% (by mass) hydrochloric acid permeability coefficient [Pz] of the tube (B) to the 35% (by mass) hydrochloric acid permeability coefficient [Py] of a monolayer tube (b) for comparison. A more preferred upper limit to the above ratio [Pz/Py] is 0.5 and a more preferred upper limit is 0.2. Within the above range, a preferred lower limit to the ratio [Pz/Py] may be set at 0.001, for instance.

The tube (B) for measurement is a tube obtained after subjecting the above-mentioned laminated tube (A) for measurement to pressure testing, and the monolayer tube (b) for comparison is a tube obtained after subjecting the above-mentioned monolayer tube (a) for comparison to the pressure testing.

The pressure testing is a test conducted by cutting the tube (A) for measurement and the monolayer tube (a) for comparison each to a length of 30 cm, sealing one end of each tube segment with a cap manufactured by Swagelok, filling the resulting tube with pure water, connecting the other end to a pump to thereby construct a pressurizing apparatus, and subjecting the whole pressuring apparatus to $10 \times 10^4$ cycles of a intermittent pressurizing procedure at 0 to 2 MPa for 1 second/cycle in a constant-temperature vessel adjusted to a temperature of 25° C.

A molded article obtained by using the CTFE copolymer mentioned above also constitutes an aspect of the invention.

The molded article of the invention may be a resin molding or a rubber-like molding but preferably is a resin molding.

The shape of the molded article of the invention is not particularly restricted but may include, for example, hoses, pipes, tubes, sheets, seals, gaskets, packing members, films, tanks, rollers, bottles, containers and so forth.

The molded article of the invention is not particularly restricted but includes, among others, block moldings, thin film- or membrane-shaped moldings, bottle-shaped moldings and tank-shaped moldings obtained by using the above CTFE copolymer.

As the thin film- or membrane-shaped moldings, there may be mentioned, for example, food packaging films, lining materials, packing members, sealing materials and sheets for use in fluid transfer lines in food manufacturing/processing steps and other fluid transfer members for food manufacturing/processing apparatuses;

Bottle stoppers and packaging films for chemicals and drugs, lining materials, packing members, sealing materials, sheets and other liquid drug transfer members for use in fluid transfer lines in chemicals or drugs manufacturing steps;

O (square) rings, tubes, packing members, valve cores, hoses, sealing materials and the like for use in automotive fuel systems and peripheral equipment, hoses, sealing materials and other fuel transfer members for use in automotive AT gears;

Carburetor flange gaskets, shaft seals, valve stem seals, sealing materials, hoses and the like for use in automotive engines and peripheral equipment, automotive brake hoses, air conditioner hoses, radiator hoses, electric wire coverings and other automotive parts;

O (square) rings, tubes, packing members, valve core members, hoses, sealing materials, rolls, gaskets, diaphragms, joints and other members for transferring liquid chemicals for semiconductor manufacturing, which are to be used in semiconductor manufacturing equipment;

Painting rolls, hoses, tubes, ink containers and other painting/inking members to be used in painting/coating equipment;

Food and drink tubes or food and drink hoses and like tubes, hoses, belts, packing members, joints and other food and drink transfer members, food packaging materials, glass cookware;

Tubes, hoses and other waste liquid transfer members for waste liquid transfer;

Tubes, hoses and other high-temperature liquid transfer members for high-temperature liquid transfer;

Tubes, hoses and other steam piping system members for steam piping;

Tapes to be wound around pipes on ship decks and other corrosion preventing tapes for piping systems;

Electric wire coverings, optical fiber coverings, transparent surface coverings to be provided on photovoltaic devices on the incidence plane side thereof in solar cells, and other various coverings;

Diaphragms of diaphragm pumps, various packing members and other sliding members;

Films for agricultural use, weathering resistant coverings for various roofing materials, side walls and so forth;

Interior finishing materials for use in the field of building/construction, coating or covering materials for glass species such as nonflammable fireproof safety glass;

Lining materials for laminated steel sheets used in household electric appliances; and so forth.

The fuel transfer members for use in automotive fuel systems further include fuel hoses, filler hoses, evaporator hoses and the like. Such fuel transfer members can also be used as fuel transfer members for and resistant to sour gasoline, alcoholic fuels, and fuels containing such a gasoline additive(s) as methyl tert-butyl ether and/or an amine.

The above-mentioned stoppers and packaging films for chemicals and drugs have good chemical resistance, for example acid resistance. As the above-mentioned chemicals/drugs transfer members, there may further be mentioned anti-corrosive tapes to be wound around pipes in chemical plants.

As the above-mentioned tank-shaped moldings, there may be mentioned, for example, automotive radiator tanks, tanks for liquid chemicals, bellows, spacers, rollers, gasoline tanks, containers for transferring waste liquids, contained for transferring high-temperature liquids, and tanks for use in fishery and pisciculture.

As other examples of the molded article of the invention, there may also be mentioned, for example, automotive bumpers or fenders, door trims, instrument panels, food processing apparatuses, cooking utensils, water-repelling oily glass species, illumination-related devices and apparatuses, display panels and housings for OA apparatuses, decorative illumination type sign boards, displays, liquid crystal displays, cellular phones, printed circuit boards, electric/electronic parts, miscellaneous goods, trash cans, bathtubs, unit baths, ventilation fans, lighting apparatus frames and so forth.

Among the thin film- or membrane-shaped moldings mentioned above, films and tubes are preferred among others. The thin film- or membrane-shaped moldings may be single-layer ones or laminated ones made of the CTFE copolymer and another layer or other layers.

As the other layer, there may be mentioned, for example, metal-made substrates, resin moldings, and rubber-made substrates and, among them, resin moldings are preferred.

As the resin moldings, there may be mentioned, among others, moldings made of a fluororesin such as PTFE or PFA, and moldings made of any of those fluorine-free resins known in the art, for example polyamide moldings. Preferably used as the fluororesin are melt-processable fluororesins. The melt-processable fluororesins include CTFE-based copolymers such as PFA and ECTFE, FEP, PVDF, ETFE and MFA, among others.

The resin moldings may be laminates comprising layers made of the same resin or different resins. When the resin moldings are laminates comprising layers made of the same resin, a layer may be a stretched one and the other layer may be an unstretched one or the laminates may be made of at least two stretched layers stretched under different conditions.

The molded article of the invention may be made of the CTFE copolymer containing one or more of such additives as fillers, pigments, electrically conductive materials, heat stabilizers, reinforcements and ultraviolet absorbers and, in the case of a rubbery molded article, the copolymer may contain one or more of such additives as crosslinking agents, acid acceptors, curing agents, curing promoters and curing catalysts.

As the electrically conductive materials among the additives, there may be mentioned, for example, carbon fibrils described in U.S. Pat. No. 46,632,330 and Japanese Kokai Publication H03-174018, among others.

The fillers and other additives mentioned above are preferably used at addition levels within the respective ranges within which the properties of the CTFE copolymer will not be deteriorated.

A fluororesin-based conductive composition resulting from incorporation of an electrically conductive material into the CTFE copolymer preferably has a surface resistance value of $1\times10^0$ to $1\times10^9$ $\Omega\cdot cm$. A more preferred lower limit is $1\times10^2$ $\Omega\cdot cm$, and a more preferred upper limit is $1\times10^8$ $\Omega\cdot cm$.

The "surface resistance value of the CTFE copolymer-based conductive composition" so referred to herein is the value obtained by charging the pellets obtained by melt kneading the electrically conductive material and CTFE copolymer into a melt indexer, heating the charge in the melt indexer to a temperature arbitrarily selected within the range of 200 to 400° C., extruding the melt and measuring the surface resistance value of the extrudate strand using a battery-powered insulation-resistance meter.

The molded article of the invention can be produced by any of the methods known in the art, for example by injection molding, extrusion molding, blow molding or rotomolding. When the molded article of the invention is a laminate comprising a layer of the CTFE copolymer and a polyimide layer, for instance, the lamination may be carried out by multilayer coextrusion molding, as will be described later herein, or by the method using a crosshead or, further, by the technique of extrusion lamination.

The molded article of the invention may have a laminated structure comprising an inorganic layer.

The inorganic layer comprises an inorganic material. The inorganic layer preferably has an inorganic matter content of not lower than 50% by mass. When the inorganic matter content is lower than 50% by mass, the molded article may be poor in gas barrier properties in some cases. From the gas barrier performance viewpoint, a more preferred lower limit to the inorganic matter content in the inorganic layer is 80% by mass, and a still more preferred lower limit thereto is 90% by mass, particularly preferably 100% by mass. In certain cases, however, a small amount of an organic material may get mixed in and, therefore, from the commercial productivity viewpoint, the inorganic matter content may be 95% by mass or lower, preferably 99% by mass or lower.

The "inorganic matter content" so referred to herein is the content of an inorganic material(s) among the components contained in the inorganic layer. The "inorganic matter content" so referred to herein is the value obtained by measuring the change in mass before and after ashing when the inorganic film or membrane is sufficiently thick to be separated off by peeling and, when the inorganic film or membrane is too thin to be peeled off, it is the value obtained upon surface analysis by electron spectroscopy for chemical analysis [ESCA] or attenuated total reflection infrared spectrometry [ATR-IR], for instance.

The inorganic material is preferably one capable of providing the product fluorine-containing molded article with gas barrier properties (hereinafter, such material is sometimes referred to as "gas barrier inorganic material"). As the gas barrier inorganic material, there may be mentioned, for example, metals such as aluminum, silicon, titanium, zinc, zirconium, magnesium, tin, copper and iron; oxides, nitrides and fluorides of such metals and like metal compounds; and carbon species such as diamond-like carbon [DLC]. The gas barrier inorganic material may comprise one single species or two or more species.

Among such gas barrier inorganic materials as mentioned above, aluminum oxide, silicon oxide and DLC are preferred in view of their transparency and good gas barrier properties. From the good gas barrier properties viewpoint, aluminum oxide and silicon oxide are preferred as the gas barrier inorganic material and, from the chemical resistance viewpoint and, in the case of the fluorine-containing molded article having a curved shape, DLC is more preferred from the viewpoint that such curved shape can be efficiently formed by the plasma chemical vapor deposition method [plasma CVD method], which is to be described later herein. The above-mentioned aluminum oxide is a compound represented by $AlO_x$ (x representing a number of 0.5 to 1.5), and the above-mentioned silicon oxide is a compound represented by $SiO_y$ (y representing a number of 0.5 to 2). As the molded article having a curved shape, there may be mentioned, for example, tubular, hose-like and like cylindrical ones.

When the gas barrier inorganic material is DLC, the inorganic film is generally a film formed of hard carbon called i-carbon or hydrogenated amorphous carbon (a-C:H) mainly by $sp^3$ bonding among carbon atoms; it is noncrystalline and has a high refractive index and a very smooth morphology. The structure of this DLC film can be generally analyzed by the following method. Based on a Raman spectrum thereof, the ratio between $sp^2$ bonds and $sp^3$ bonds is evaluated from the relative Raman spectrum intensity ratio between two separated bands, namely the D band at around 1390 $cm^{-1}$ and the G band at around 1530 $cm^{-1}$, namely the ratio $(I_D/I_G)$. In short, it is said that a lower $I_D/I_G$ ratio value indicates a greater abundance in $sp^3$ bonds (Reference Document: Naoyuki Yamamoto: Tribologist, Vol. 41, No. 9, p. 760 (1996)).

Further, a DLC film generally contains an element(s) other than carbon, and the concentration of hydrogen and other elements contained in the DLC layer is influenced by the raw material gas species used as the carbon source, the amounts of impurities and the amounts of additives in the plasma forming atmosphere, the plasma formation conditions, and the way of electrode disposition, among others. When, for example, the raw material gas used as the carbon source contains hydrogen, the DLC film obtained generally contains not more than 7% by mass of hydrogen. When the raw material gas used as the carbon source contains oxygen or when the degree of vacuum is low during plasma formation, oxygen in the raw material gas or oxygen in the air may be fixed in the DLC film and this is unfavorable from the gas barrier performance viewpoint. The oxygen content in the DLC film is preferably not higher than 5% by mass.

The inorganic layer preferably has a thickness of $5\times10^{-9}$ to $1\times10^{-6}$ m. At thickness levels below $5\times10^{-9}$ m, the layer is too thin, so that the gas permeability may be high in some instances. At levels exceeding $1\times10^{-6}$ m, the pliability and flexibility become poor, so that some shapes are susceptible to cracking and the gas permeability becomes high in certain cases. From the gas permeability viewpoint, a more preferred lower limit to the thickness of the inorganic layer is $1\times10^{-8}$ m, and a more preferred upper limit thereto is $1\times10^{-7}$ m and a still more preferred upper limit is $8\times10^{-8}$ m. From the pliability, flexibility and transparency viewpoint, a particularly preferred upper limit to the thickness of the inorganic layer is $7\times10^{-8}$ m.

The inorganic layer thickness referred to herein is the value obtained by the measurement method described below, since the actual inorganic layer thickness on the fluorine-containing molded article obtained cannot be measured because of the occurrence of surface irregularities, about several $10\times10^{-10}$ m on the fluorine-containing molded article. Thus, simultaneously with the inorganic layer formation on the fluorine-containing molded article, an inorganic layer is formed on a silicon wafer partly masked beforehand with a Kapton (registered trademark) adhesive tape. After taking out, the difference in level between the masked portion and unmasked portion is measured using a Talystep profilometer (product of Taylor Hobson). The thickness of the inorganic layer formed on the silicon wafer is regarded as the thickness of the inorganic layer on the fluorine-containing molded article.

The inorganic layer is preferably one excellent in transparency for some fields of application of the fluorine-containing molded article. The inorganic layer preferably has a haze value not exceeding 30%, more preferably not exceeding 20%. So long as the haze value is within the range given above, the inorganic layer may have a haze value of 0.5% or above or, further, 1% or above, since a transparency level generally required is retained then. The inorganic layer as one excellent in transparency preferably is a rather thin one, and such a DLC layer as mentioned above is preferred. The haze value referred to herein is the value measured according to JIS K 7136 using a haze meter (direct reading haze meter, product of Toyo Seiki Seisakusho).

The molded article of the invention is preferably used as a fluid transfer member since, then, the good characteristics, such as chemical resistance, low liquid permeability and thermal stability, of the CTFE copolymer of the invention can be fully utilized. The "fluid transfer member" so referred to herein is a molded article obtained by using the CTFE copolymer and is a member particularly suited for fluid transfer.

The fluid transfer member is not particularly restricted but includes, for example, tubes (pipes), joints and other piping/tubing system members, and films to be used in diaphragm pumps.

The fluid transfer member generally has a region coming into contact with a fluid. In the case of a tubular member such as a tube or hose, the inside thereof comes into contact with a fluid and, therefore, when the tubular member is a laminated member, the innermost layer comes into contact with a fluid such as a liquid chemical or food or drink.

The fluid transfer member may be a member made of a single layer of the CTFE copolymer of the invention or a laminated member consisting of a single layer of the CTFE copolymer and another resin layer or other resin layers.

As examples of the fluid transfer member, there may be mentioned, from the initial stage to the later stage in a process in which a liquid chemical is handled, sealing members at joints, tubular bodies manufactured by lining treatment of metal tubes, tanks manufactured by lining treatment of metal cans or drums, buffer tanks for flow rate stabilization, various sensor means, filter housings, and so forth.

While the conventional use of highly permeating liquid chemicals in the vicinity of joint headers produces not only such problems as corrosion of surrounding metal members but also such problems as degradation of resin-embedded rubber rings by that portion of such a liquid chemical which has permeated through the resin, it is possible, by applying the resin of the invention, to markedly reduce such an influence of a liquid chemical that has permeated through sealing sites and has evaporated as corroding surrounding metal members and, in the case of resin-embedded rings, reduce the degradation of the inside rubber members. As the forms applicable here, there may be mentioned valve seals, rubber embedding members of embedded packing members, and the like. These can be obtained by injection molding, or secondary processing of extrusion moldings, for instance.

The fluid to be transferred by means of the above fluid transfer member may be a gas or liquid, and the liquid may be a volatile one or a fluid containing solid particles such as abrasive particles.

The fluid is not particularly restricted but includes, among others, food and drink, for example milk, gases and liquid chemicals.

The gases are not particularly restricted but include, for example, ozone, hydrogen, oxygen and low-molecular fluorocarbons, and the gases enumerated here may be gases used in the field of semiconductor manufacture.

The above-mentioned liquid chemicals are not particularly restricted but include, among others, organic acids such as acetic acid, formic acid, cresol and phenol; inorganic acids such as hydrofluoric acid, sulfuric acid, nitric acid, phosphoric acid and hydrochloric acid; peroxides such as aqueous hydrogen peroxide; mixed liquids composed of such an inorganic acid as mentioned above and aqueous hydrogen peroxide, for example phosphoric acid-aqueous hydrogen peroxide and sulfuric acid-aqueous hydrogen peroxide; alkaline solutions such as sodium hydroxide solutions, potassium hydroxide solutions and aqueous ammonia; alcohols such as methanol and ethanol; amines such as ethylenediamine, diethylenetriamine and ethanolamine; amides such as dimethylacetamide; esters such as ethyl acetate and butyl acetate; hydrocarbon solvents such as xylene; chlorinatd solvents such as trichloroethylene; ketones such as acetone; ozonated water; ultrapure water; functional water; and mixtures of two or more of these liquids. The functional water mentioned above is a liquid resulting from dissolution of hydrogen and ammonia in ultrapure water and is used in the field of semiconductor manufacture.

The liquid transfer member mentioned above is not particularly restricted but includes, among others, the above-mentioned fluid transfer members for food manufacture/processing apparatuses, liquid chemical transfer members, fuel transfer members, liquid chemical transfer members for use in manufacturing semiconductor devices, and food and drink transfer members. Among them, liquid chemical transfer members for manufacturing semiconductor devices are preferred.

When the fluid transfer member is a lined tubular body, it is a problem in the art that in the case of there being a space between the lining layer and tubular body (in the case of loose piping), that portion of a liquid chemical which has permeated the lining layer reacts with the metal substrate to form hydrogen gas, the pressure of which causes expansion of the lining layer toward the inside, making it no more possible to secure an appropriate rate of flow. In cases where the lining layer is in close contact with the tubular body through the intermediary of an adhesive layer, the gas deteriorates the adhesive layer to cause outgassing, which in turn produces such an expansion problem as mentioned above and causes corrosion of the metallic tubular body as well. In the worst case, through holes are formed in the metallic tubular body, allowing the occurrence of an inflow of rainwater. On the contrary, when the low permeability material of the invention is applied, the amount of lining layer-permeating liquid chemicals can be markedly reduced, so that the life of the lined tubular body can be prolonged. As the forms applicable here, there may be mentioned tubes and sheets, among others, and these can be obtained mainly by extrusion molding.

In the case of tanks in the form of lined cans or drums, too, the use of a highly permeating liquid chemical causes the same problems as mentioned above due to the liquid chemical that has permeated. By applying the low permeability material of the invention, however, it is possible to prolong the life of the tanks. On the other hand, the low permeability material of the invention can show a peel strength of not lower than 15 N/cm against metal substrates such as iron or SUS stainless steel substrates when only a slight contact pressure is applied thereto at an appropriate temperature and, therefore, the use of an adhesive layer can be omitted, which contributes to cost reduction in tank manufacture. On that occasion, the temperature in question is preferably 190 to 250° C., and the means of heating includes, but is not limited to, a hot air heater and a heating iron, among others. The use of a heating iron on the occasion of pressure application can also result in simplification of the operational procedure. The pressure is preferably not lower than 0.05 MPa. The peel strength evaluation is preferably carried out according to JIS C 5016.

Generally, the buffer tanks are often constituted of a single resin alone and, when the low permeability resin of the invention is applied as that resin, the liquid chemical permeation can be reduced and, accordingly, the damaging of peripheral members can be reduced. Such tanks can be obtained by blow molding or rotomolding, for instance, and the MFR of the resin is preferably 1 to 3 g/10 minutes for blow molding and, for rotomolding, it is preferably 4 to 8 g/10 minutes. For the molded article to have an increased thickness, the volatile matter content is preferably not higher than 0.08% by mass as expressed in terms of the volatile matter-due loss in weight after 1 hour of heating at 300° C.

While sensors are very important in controlling liquid chemical lines, detecting or sensing elements may be damaged and/or basic detection value levels may increase as a result of permeation of liquid chemicals and, therefore, the maintenance thereof is very complicated and also produces a cost problem. In the case of a pressure sensor, for instance, the deformation of a diaphragm disposed in a bypass line parallel to a liquid chemical flow line is detected by measurements using a metal-made pressure sensing device. However, the pressure sensing device is corroded by permeation of the liquid chemical and normal detection becomes difficult. In the case of a piezoelectric element-driven diaphragm pump as well, in which a thin diaphragm is finely oscillated and which encounters similar problems, the liquid chemical that has permeated the diaphragm damages the piezoelectric element and thus causes troubles in normal functioning. In the case of a liquid chemical concentration sensor, by which the concentration of a liquid chemical is detected by detecting the increase or decrease in specific absorption by spectrophotometric means through a transparent tube, the basal detection level gradually rises with the penetration of the liquid chemical into the tube wall, if permeable, and eventually exceeds the detection range; this is another problem. By using the low permeability resin according to the invention, it is possible to reduce the influences of these problems. The conceivable shapes suited for such fields of application include, but are not limited to, tubes, sheets and diaphragms, among others, and an appropriate shape should be selected according to each method of detection.

For the passage of a liquid chemical, foreign matter removal by means of a filter is essential and, in the case of filter casings, in particular, the liquid chemical is often in a heated condition at a high temperature, so that the degree of penetration increases and the damage of the surrounding members is increased accordingly. For reducing the penetration of the liquid chemical, it becomes necessary to mold shaped articles increased in wall thickness; however, with the increase in wall thickness, cracking tends to occur more easily and, further, the deformation due to the own weight cannot be ignored any longer. By using the molded article according to the invention, it becomes possible to reduce the liquid chemical penetration even when the molded article is relatively thin-walled; in addition, that molded article is high in elastic modulus as compared with such resins in conventional use as PTFE, PFA and FEP and, therefore, the elastic deformation due to the own weight can be reduced. Such filter casings are mostly molded by injection molding and, therefore, the resin to be used preferably has a MFR of 10 to 20 g/10 minutes.

The fluid transfer member mentioned above, when it is a laminated tube, may be one obtained by melting the respective layer-constituting resins or elastomers respectively and molding them by such a conventional multilayer coextrusion molding method as the multimanifold or feedblock method, or may be one obtained by using a crosshead for extruding the CTFE copolymer of the invention in a molten state onto a pipe manufactured in advance.

The CTFE copolymer of the invention can be suitably used in melt molding.

The CTFE copolymer of the invention may also be made into a liquid coating composition by dissolution in an organic liquid or dispersion in water and/or an organic liquid, or may be used in the form of a powder coating composition.

Usable as the above organic liquid are such conventional solvents as hydrocarbons, esters, ethers and ketones.

The liquid coating composition or powder coating composition mentioned above may contain one or more of crosslinking agents, acid acceptors, curing agents, curing promoters, curing catalysts, fillers, pigments, electrically conductive materials, heat stabilizers, reinforcing agents, ultraviolet absorbers and the like.

The above-mentioned powder coating composition may comprise not only the above-mentioned CTFE copolymer but also one or more resins other than the CTFE copolymer, according to need. The other resins are not particularly restricted but may include those resins generally used in powder coating compositions, either thermoplastic or thermosetting. The other resins are preferably thermally stable resins, more preferably those resins which will not be decomposed at the temperature at which heating is carried out on the occasion of coating with the CTFE copolymer. As the thermally stable resins, there may be mentioned, for example, silicone resins, fluorosilicone resins, polyamide resins, polyamideimide resins, polyimide resins, polyester resins, epoxy resins, polyphenylene sulfide resins, phenol resins, acrylic resins and polyethersulfone resins, among others. Such other resins may be used singly or two or more of them may be used in combination.

The powder coating composition mentioned above may comprise, in addition to the above-mentioned CTFE copolymer, one or more additives and/or the like added according to need. The additives are not particularly restricted but includes those added to conventional powder coating compositions, for example, color pigments such as titanium oxide and cobalt oxide, for the purpose of coloring; rust preventive pigments, calcined pigments and other pigments, for the purpose of rust prevention; carbon fibers, glass fibers, glass flakes, mica and other fillers, for the purpose of reducing the shrink of coatings and/or for the purpose of increasing the hardness of coatings to improve the resistance thereof to damaging; and electric conductivity imparting materials such as conductive carbon species, for the purpose of imparting electric conductivity. The additives further include leveling agents, antistatic agents, ultraviolet absorbers, radical scavengers and so forth.

The method of producing the powder coating composition of the invention is not particularly restricted but includes those methods known in the art, for example the grinding method, granulation method and spray drying method. The grinding method comprises, for example, grinding or milling the raw material, namely the above-mentioned CTFE copolymer, if necessary together with one or more other resins such as mentioned above and/or one or more additives such as mentioned above, using a grinder or mill such as a pin mill or impeller mill. The granulation method mentioned above comprises, for example, granulating the raw material(s) mentioned above using granulator such as a Henschel mixer or high speed mixer. The spray drying method mentioned above comprises, for example, dispersing the above-mentioned raw material(s) in a solvent and spraying the dispersion into an atmosphere maintained at a temperature not lower than the melting point of the above-mentioned CTFE copolymer to give a powder. The method of producing the powder coating composition may also comprise mixing up the above-mentioned raw material(s) beforehand in a mixer, melt kneading the mixture in a kneader or melt extruder, for instance, and then grinding the mixture, if necessary followed by classification.

The particle diameter of the above powder coating composition is not particularly restricted but, generally, smaller particles are preferred from the coat-substrate adhesion viewpoint while greater particles are preferred for increasing the coat thickness. The particle diameter of the powder coating composition may be properly determined according to the intended coat thickness; thus, for example, it is preferably 10 to 100 μm.

The coat layer forming method for the formation of coatings using the above powder coating composition may comprise, for example, the step of applying the powder coating composition to a substrate and the step of heat treatment.

By saying "the step of applying the powder coating composition to a substrate and the step of heat treatment" herein, it is meant that the steps may constitute a coating method (P) according to which the application of the powder coating composition to the substrate and the heat treatment are carried out simultaneously or almost simultaneously or a coating method (Q) according to which the application of the powder coating composition to the substrate is followed by the heat treatment. As the coating method (P), there may be mentioned, for example, the rotational molding method or the like method comprising applying the powder coating composition to a substrate while carrying out the heat treatment, and the fluidization dip coating method or the like method comprising dipping a heated substrate in the powder coating composition. As the coating method (Q), there may be mentioned, for example, the electrostatic powder coating method.

The phrase "applying the powder coating composition to a substrate" as used herein conceptually includes, within the meaning thereof, placing the powder coating composition directly on the surface of the substrate and placing the powder coating composition on the substrate surface via a primer layer so that the primer layer may lie between the coat layer obtained from the powder coating composition and the substrate. The "primer layer" so referred to herein is a coat layer obtained by applying a primer onto the substrate. The primer is generally an undercoating composition used to improve the adhesion between the coat layer and substrate.

The coat layer mentioned above may be in contact with the substrate. The powder coating composition based on the CTFE copolymer may be one such that the coat layer and substrate come into contact without interposition of any primer layer. The use of a primer layer to further improve the adhesion between the coat layer and substrate is not excluded, however.

When the above-mentioned primer layer is absent, the above powder coating composition may be advantageous in that the decomposition or elution of a compound, for example, contained in the primer and/or the possible decrease in surface smoothness of the coat layer obtained due to the presence of the primer layer can be prevented in some cases and that the color, pattern or like surface appearance of the substrate can be utilized in certain fields of application.

The heat treatment in the above-mentioned coat layer forming method is preferably carried out at a heating temperature not lower than the melting point of the CTFE copolymer but not higher than the decomposition temperature. When the heating temperature is lower than the melting point of the CTFE copolymer, the adhesion between the coat layer obtained and the substrate will be insufficient in some instances and, when that temperature is above the decomposition temperature of the CTFE copolymer, the performance characteristics of the fluororesin may possibly be impaired. Considering the surface smoothness of the coat layer obtained and the possibility of foaming and discoloration, a preferred upper limit to the above heating temperature is 300° C.

The time of the above heat treatment may vary according to the CTFE copolymer species, the coat layer thickness and so forth. For obtaining coat layers about 30 to 150 μm in thickness, the time may be 15 to 60 minutes, and a preferred upper limit is 30 minutes.

The coat layer forming method of the invention is to form coat layers using the above-mentioned powder coating composition and preferably comprises, following application of the powder coating composition to a substrate, the step of carrying out the heat treatment at a heating temperature not lower than the melting point of the CTFE copolymer but lower than 300° C.

When the powder coating composition shows a low melting point, the above heating temperature may be at a relatively low level adapted to the substrate's thermal stability limit temperature and, even at 200° C., coat layers satisfactory in adhesion strength and surface smoothness can be obtained.

The substrate to which the above CTFE copolymer-based powder coating composition is to be applied is not particularly restricted but may be any of those thermally stable at the above-mentioned heating temperature, including those made of an organic material, inorganic material or metallic material, for instance.

The organic material mentioned above includes, among others, thermally stable ones selected from among thermoplastic resins, thermosetting resins, synthetic rubbers and so forth. Since the powder coating composition of the invention is low in melting point and the heating temperature therefor can be lowered, the organic material usable as the substrate can be selected within a wide range of organic materials as compared with the conventional fluororesin-based powder coating compositions. The organic material may comprise one single species or a composite composed of two or more species.

As the thermoplastic resins, there may be mentioned fluororesins other than the CTFE copolymer, polyphenylene oxide [PPO] resins and like polyacetal resins, polyester resins, polyamide resins, polyaramide resins, polyimide resins, polyamideimide resins, polycarbonate resins, acrylic resins, styrenic resins, acrylonitrile/butadiene/styrene [ABS] resins, vinyl chloride resins, ethylene/vinyl alcohol resins, cellulosic resins, vinyl acetate resins, polyetheretherketone [PEEK] resins, polysulfone resins, polyethersulfone [PES] resins, polyetherimide resins, polyvinyl alcohol resins, polyphenylene sulfide resins and modified polyolefin resins, among others. As the modified polyolefin resins, there may be mentioned, for example, epoxy-modified polyolefin resins.

As the thermosetting resins, there may be mentioned, for example, amino resins, epoxy resins, unsaturated polyester resins, phenol resins, urethane resins and silicone resins.

As the synthetic rubbers, there may be mentioned, for example, nitrile/butadiene rubbers, isoprene rubbers, styrene/butadiene rubbers, chloroprene/acrylonitrile rubbers, ethylene/propylene rubbers, urethane rubbers, silicone rubbers, fluororubbers, chlorosulfonated polyethylene rubbers, acrylic rubbers, epichlorohydrin rubbers, polysulfide rubbers and chlorinated polyethylene rubbers.

The inorganic material mentioned above is not particularly restricted but includes, for example, quartz; glass materials such as crystallized glasses or glass ceramics, cellular glasses, heat ray reflecting glasses, heat ray absorbing glasses and double glazings; ceramic-based substrates such as tiles, ceramics and bricks; natural stones; concrete-based substrates or cement-based substrates; and silicon species such as monocrystalline silicon, polycrystalline silicon and amorphous silicon.

As the above-mentioned metallic material, there may be mentioned, for example, such metals as aluminum, iron, nickel, titanium, molybdenum, magnesium, manganese, copper, silver, lead, chromium, beryllium, tungsten and cobalt, compounds of these metals, and alloys composed of two or more of such metals.

The substrate made of such a metallic material as mentioned above may be one the metal surface of which has been subjected, for example, to coating with another metal by electroplating, hot dip metal coating, chromizing, siliconizing, calorizing, sheradizing or spray deposition, for instance, to phosphate coat layer formation by phosphate treatment, to metal oxide formation by anodic oxidation or thermal oxidation, or to electrochemical anticorrosion treatment, for the purpose of corrosion prevention.

The substrate mentioned above may be one subjected to such surface roughening treatment as sand blasting, shot blasting, grid blasting, honing, paper scratching, wire scratching or hair line, for the purpose of improving the adhesion to the coat layer.

The above-mentioned CTFE copolymer-based powder coating composition can be adequately applied to the above-mentioned substrate even when it has a surface roughness (Ra) not exceeding 0.1 μm. The "surface roughness (Ra)" so referred to herein is the value obtained by the method of measurement according to JIS B 1982. As the substrate having a surface roughness (Ra) within the above range, there may be mentioned, for example, those which have not yet subjected to such surface roughening treatment as mentioned above. In cases where the CTFE copolymer of the invention is heat-treated at a temperature lower than 300° C., the adhesion between the above substrate and the coat layer obtained can be sufficient from the practical viewpoint without subjecting the substrate to any surface roughening treatment; it is not excluded, however, to subject the substrate to such surface roughening treatment as mentioned above for further improving the adhesion between the coat layer and substrate.

When, in the coat layer forming method of the invention, the treatment temperature is lower than 300° C., the coat layer may be an adhesive functional group-containing one, which is obtained from the powder coating composition mentioned above. Since the above coat layer is obtained from the above powder coating composition, the adhesion to the substrate and the surface smoothness thereof are good and the coat layer has such characteristics of the CTFE copolymer as thermal stability, corrosion resistance, chemical resistance, nonstickiness and so forth.

The coat layer forming method of the invention can give a laminate structure comprising the above-mentioned substrate and the above-mentioned coat layer. The laminate structure may comprise the above-mentioned substrate and coat layer with the above-mentioned primer layer sandwiched therebetween. Since the powder coating composition of the invention is used, however, the substrate can be in contact with the coat layer without any interposing primer layer.

The laminate of the invention comprises a substrate and a coat layer obtained by applying the powder coating composition mentioned above onto the substrate, followed by heat treatment. This laminate has a laminate structure build up of the above-mentioned substrate and coat layer in contact with each other without interposition of the above-mentioned primer layer. The laminate, which comprises the coat layer obtained from the above-mentioned powder coating composition, is sufficient in coat layer-substrate adhesion from the practical viewpoint even when the coat layer is in contact with the substrate. As the above substrate, there may be mentioned the same ones as described hereinabove referring to the substrate mentioned above.

The laminate may be one comprising the above-mentioned substrate and coat layer and, further, another layer disposed on the coat layer. The other layer is not particularly restricted but may be one made of an organic material, inorganic material or metallic material, which material may comprise one single species or two or more species.

As for the field of use of the above-mentioned laminate structure and the laminate of the invention, there may be mentioned coatings or coverings for protecting the substrate against erosion due to liquid chemicals and the like, and coatings or coverings for providing the substrate surface with nonstickiness.

As for the field of utilization of the above-mentioned coatings or coverings for protecting the substrate against erosion due to liquid chemicals and the like, there may be mentioned, for example, semiconductor manufacturing apparatus and semiconductor manufacturing apparatus parts, such as valves, tanks, diaphragms, wafer carriers and wafer supports; piping materials such as tubes, hoses and joints; instruments and utensils for chemical or medical use; and corrosion-resistant linings for pipes, valves, joints, pumps and tanks. The above-mentioned semiconductor manufacturing apparatus and semiconductor manufacturing apparatus parts are semiconductor manufacturing apparatus and/or parts constituting semiconductor manufacturing apparatus. The piping materials mentioned above may be those which are used in or as the above-mentioned semiconductor manufacturing apparatus or semiconductor manufacturing apparatus parts. As the liquid chemicals, there may be mentioned such highly corrosive liquid chemicals as hydrofluoric acid.

The CTFE copolymer of the invention can also be used as such an additive as a slip agent or processing aid.

Effects of the Invention

The CTFE copolymer of the invention, which has the constitution described above, has both stress cracking resistance and low chemical liquid permeability in a balanced manner and can give moldings endowed with chemical resistance as well as thermal stability required in the step of molding as well.

BEST MODES FOR CARRYING OUT THE INVENTION

The following examples illustrate the present invention more specifically. These examples are, however, by no means limitative of the scope of the invention.

Example 1

A jacketed mixing vessel-type polymerizer with a capacity of 400 kg of water was charged with 100 kg of demineralized pure water, and the inside space was sufficiently purged with pure nitrogen gas and then the nitrogen gas was eliminated by evacuation. Then, 200 kg of octafluorocyclobutane, 9.13 kg of chlorotrifluoroethylene [CTFE], 20 kg of tetrafluoroethylene [TFE] and 10 kg of perfluoro(propyl vinyl ether) [PPVE] were fed under pressure to the polymerizer, the temperature was adjusted to 35° C. and stirring was started. Thereto was added 0.5 kg of a 50% (by mass) methanolic solution of di-n-propyl peroxydicarbonate [NPP] to initiate the polymerization. During polymerization, the vessel inside pressure was maintained at 0.68 MPa while additionally feeding a monomer mixture prepared so that the composition thereof might be equal to the desired copolymer composition and, after carrying out the polymerization until arrival of the total additional charge amount at about 10% by mass relative to the solvent, the residual gases in the vessel were discharged, and the polymer formed was taken out, washed with demineralized pure water and dried to give 25.7 kg of a CTFE copolymer (A) as a granular powder. The CTFE copolymer A obtained was evaluated for the following physical characteristics. The results are shown in Table 2.

[Thermal Decomposition Starting Temperature]

Using a thermo-gravimetric/differential thermal analyzer [TG-DTA] (trademark: TG/DTA 6200, product of Seiko Denshi), a sample (10 mg) was heated from room temperature at a rate of 10° C./minute, and the temperature required for the sample to lose 1% by mass of the mass thereof was determined and regarded as the decomposition starting temperature.

[Melting Point]

Using a differential scanning calorimeter [DSC] (trademark: RDC 220, product of Seiko Denshi), a sample (3 mg) was heated from room temperature at a rate of 10° C./minute, and the melting peak temperature was regarded as the melting point.

[MFR]

Using a melt indexer (product of Toyo Seiki Seisakusho), the mass of the copolymer allowed to flow out through a nozzle with an inside diameter of 2 mm and a length of 8 mm for 10 minutes as measured at a temperature higher by 70° C. than the melting point of the polymer under a load of 5 kg according to ASTM D 3307-01.

[Content of Each Comonomer]

The content of each monomer unit species was calculated by properly combining the techniques of NMR, FT-IR, elemental analysis and fluorescent X ray analysis according to the kind of component [A]. In the case of a CTFE-TFE-PPVE terpolymer, for instance, the content of each comonomer can be calculated using the analytical data obtained by $^{19}$F-NMR spectrometry and elemental analysis for carbon (C) and the following calculation formula:

$$x = \frac{1}{16.455}\left(11646.9 + 149.565z - \left(\frac{2402.2 + 36.033z}{0.01\,Mc}\right)\right)$$
$$y = 100 - x - z$$

x: TFE content (mole percent), y: CTFE content (mole percent), z: PPVE content (mole percent), Mc: C content (wt %).

In the above formula, the PPVE content (z) can be determined by $^{19}$F-NMR spectrometry. The carbon (C) content (Mc) can be determined by elemental analysis. Using these values, the TFE content (x) and CTFE content (y) can further be calculated.

[35% (By Mass) Hydrochloric Acid Permeability Coefficient of the Sheet]

A sheet having a total thickness of 0.2±0.03 mm was obtained by compression molding of the copolymer at a molding temperature higher by 50 to 70° C. than the melting point thereof and at a molding pressure of 5 MPa. The sheet obtained was sandwiched between two glass vessels 12a and 12b (each having a capacity of 200 ml) shown in FIG. 1 in the middle thereof using fluororubber-made O rings 13. The vessel 12a on one side of the sheet was filled with 200 ml of 35% (by mass) hydrochloric acid and the other vessel 12b with 200 ml of pure water, and the whole was allowed to stand in a constant-temperature vessel at 25° C. (the area of the sample sheet in contact with the liquids being 70 mm φ). After standing in this condition, about 1 ml was sampled from a sampling opening 14 of the pure water side vessel 12b and the chloride ion concentration Y (ppm) in the pure water side sample was determined using an ion chromatograph (trademark: IC 7000-E, product of Yokogawa Electric Corp.).

The hydrochloric acid permeability coefficient X (g·cm)/(cm$^2$·sec) was calculated as follows:

X=(β×specimen thickness)/sectional area where β=gradient, in an α-versus-T plot, of the segment corresponding to the period (T$_β$) during which a shows straight-line changes relative to T;
α=total quantity permitted (unit: g)=Y×W×10$^{-6}$ (unit: g/sec);
W=amount of pure water (unit: ml);
T=elapsed time between the start of permeation testing and sampling (unit: sec);
specimen thickness=sheet thickness or tube wall thickness (unit: cm);
sectional area=area of that part of the sample sheet or tube which is in contact with pure water in the permeability testing apparatus (unit: cm$^2$).

[MIT Folding Endurance of Sheet]

A sheet, 13 mm in width and 210 to 230 μm in thickness, of the CTFE copolymer or a PFA or PCTFE as molded at a molding temperature higher by 50 to 70° C. than the melting point and at a molding pressure of 5 MPa was repeatedly folded under the conditions prescribed in ASTM D 2176 using a MIT folding endurance tester (product of Toyo Seiki Seisakusho) and the number of repetitions of folding before fracture was counted. The results are shown in Table 2.

[Manufacture of Laminated Tube A]

Using a two-resin two-layer tube extruding machine equipped with a multimanifold die, a laminated tube (A) consisting of an outer layer made of the CTFE copolymer A and an inner layer made of a PFA (trademark: NEOFLON AP231SH, product of Daikin Industries) was obtained by continuously molding a tube having an outside diameter of 19.1 mm, an inside diameter of 15.9 mm and an outer layer thickness of 0.2 mm by feeding the CTFE copolymer A and PFA, each as pellets, to the outer layer extruder and inner layer extruder, respectively. The temperature conditions on that occasion of molding are shown in Table 2.

[Copolymer A-to-PFA Adhesion Strength Measurement]

Test specimens, 1 cm in width, were cut out from the laminated tube A and subjected to a 180° peel test on a Tensilon universal testing machine at a rate of 25 mm/minute, and the initial adhesion strength (N/cm) was determined as the mean of five maximum points in elongation-tensile strength graphs.

[Copolymer A-to-FEP Adhesion Strength Measurement]

The CTFE copolymer and a FEP resin (trademark: NEOFLON FEP NP30, product of Daikin Industries) were subjected to compression molding at a temperature higher by 50 to 70° C. than the melting point of the resin higher in melting point and at a molding pressure of 5 MPa to give a sheet having a total thickness of 0.5±0.05 mm. The sheet obtained was subjected to compression molding at a molding pressure of 0.2 MPa and a molding temperature of 340° C. Test specimens, 1 cm in width, were cut out from this compression molded sample having a laminated structure and subjected to a 180° peel test on a Tensilon universal testing machine at a rate of 25 mm/minute, and the initial adhesion strength (N/cm) was determined as the mean of five maximum points in elongation-tensile strength graphs.

[Preparation of Laminated Tube B]

The laminated tube A was cut to a length of 30 cm, one end was sealed with a Swagelok cap and, after filling with pure water, a pump was connected to the other end to constitute a pressing apparatus. The whole pressing apparatus was placed in a constant-temperature vessel adjusted at a temperature of 25° C. Then, repeated pressurization testing of the laminated tube A was started under automatic control so that a 1 second/cycle pressurization/pressure release procedure (from 0 MPa to 2 MPa) might be carried out. After 10$^5$ pressurization/ pressure release cycles, the pump was stopped, and the tube was taken off and dried. This is referred to as "laminated tube B".

[35% (By Mass) Hydrochloric Acid Permeability Coefficients of the Laminated Tubes A and B]

The 35% (by mass) hydrochloric acid permeability coefficients of the laminated tubes A and B specified in Table 2 were determined by the following method, which is illustrated in FIG. 2. First, each laminated tube was cut to a length of 30 cm, one end of the tube 21 was thermally melt-sealed, 52 ml of 35% (by mass) hydrochloric acid was placed in the tube 21, and the other tube end was also melt-sealed. The hydrochloric acid-containing tube 21 was inserted in a glass tube 22 and fixed there by means of fluororubber packing members 23. Then, 110 ml of pure water was fed to the glass tube 22 through a sampling opening 24, and the whole was placed in a constant-temperature vessel maintained at 25° C. On that occasion, the tube 21 between the packing members 23 was in contact with pure water, and the length of the contacting portion was 18.5 cm. The system was allowed to stand in that condition, and samples (each amounting to about 1 ml) were taken through the sampling opening 24 and the chloride ion concentration in each pure water sample was determined using an ion chromatograph, like in the case of sheet permeability testing.

[Percent Change in Specific Gravity]

A surface layer to a depth of 100 μm was stripped off from the outer layer surface of the laminated tube A specified in Table 2 using a microtome. The thus-prepared sample had a rectangular shape, 100 μm in maximum thickness, 3 mm long in the direction of extrusion and 1 mm long in the circumferential direction. Ten such rectangular specimens were prepared from each laminated tube species. The specific gravity of each specimen was measured using a density gradient tube, and the mean of 10 values was regarded as the specific gravity $X_1$ of the outer layer of the laminated tube A. Separately, the resin specified in Table 2 was compression-molded at a molding temperature higher by 50 to 70° C. than the melting point of each resin and a molding pressure of 5 MPa to give a sheet having a total thickness of 0.2±0.03 mm. Rectangular specimens, 100 μm in maximum thickness, 3 mm long in the direction of extrusion and 1 mm long in the circumferential direction, were cut off from the sheet obtained. Ten such rectangular specimens were prepared from each sheet species. In the same manner as the specific gravity $X_1$ of the above-mentioned laminated tube, the specific gravity of each of these specimens was measured using a density gradient tube, and the mean of 10 values was regarded as the specific gravity Y of the compression-molded sheet. The percent change D in specific gravity was calculated as follows:

$$D = X_1/Y \times 100 (\%)$$

The thus-obtained D value is shown in Table 2.

Example 2

The polymerization and after-treatment were carried out in the same manner as in Example 1 except that 19.3 kg of CTFE and 13 kg of TFE were used in the initial monomer charge, to give 20.6 kg of a CTFE copolymer (B) as a granular powder. Since the CTFE copolymer B obtained had a relatively low melting point, the tetrafluoroethylene/perfluoro(methyl vinyl ether) copolymer [MFA] described later in Comparative Example 5, which had a melting point lower than that of PFA, was used as the inner layer of the laminated tube. The copolymer was measured for adhesion strength with PTFE, without carrying out the adhesion strength measurement with PFA or with FEP. Otherwise, the same physical characteristics evaluations as in Example 1 were carried out. The results are shown in Table 2.

[Copolymer-to-PTFE Adhesion Strength Measurement]

The CTFE copolymer was compression-molded at a temperature higher by 50 to 70° C. than the melting point thereof and at a molding pressure of 5 MPa to give a sheet with a total thickness of 0.5±0.05 mm. The sheet and a PTFE sheet (trademark: NEW POLYFLON PTFE M112, product of Daikin Industries) were compression-molded at a molding pressure of 0.2 MPa and a molding temperature of 340° C. Test specimens, 1 cm in width, were cut out of the compression molded sample having a laminated structure and subjected to a 180° peel test at a rate of 25 mm/minute using a Tensilon universal testing machine, and the initial adhesion strength (N/cm) was determined as the mean of five maximum points in elongation-tensile strength graphs.

Example 3

The polymerization and after-treatment were carried out in the same manner as in Example 1 except that 5.8 kg of CTFE and 49.6 kg of TFE were used in the initial monomer charge, to give 24.6 kg of a CTFE copolymer (C) as a granular powder. The CTFE copolymer C obtained was evaluated for the same physical characteristics as in Example 1. The results are shown in Table 2.

Example 4

The polymerization and after-treatment were carried out in the same manner as in Example 1 except that 2.4 kg of CTFE and 24.2 kg of TFE were used in the initial monomer charge, to give 23.8 kg of a CTFE copolymer (D) as a granular powder. No laminated tube B was manufactured from the CTFE copolymer D and, otherwise, the copolymer D was evaluated for the same physical characteristics as in Example 1. The results are shown in Table 2.

Example 5

The polymerization and after-treatment were carried out in the same manner as in Example 1 except that 41.5 kg of CTFE and 4.6 kg of TFE were used in the initial monomer charge, to give 22.6 kg of a CTFE copolymer (E) as a granular powder. At this time, the rate of polymerization lowered to 71% as compared with Example 2. The CTFE copolymer E obtained was evaluated for the same physical characteristics as in Example 2 except for the MIT folding endurance and adhesion strength (with PTFE) measurements, which were omitted. The results are shown in Table 2.

Example 6

The polymerization and after-treatment were carried out in the same manner as in Example 1 except that 9.2 kg of CTFE, 21.1 kg of TFE and 3.1 kg of PPVE were used as the initial charge monomers, to give 24.8 kg of a CTFE copolymer (F) as a granular powder. The CTFE copolymer F obtained was evaluated for the same physical characteristics as in Example 1 except for the adhesion strength measurements (with PFA, FEP and PTFE), which were omitted. The results are shown in Table 2.

Example 7

The polymerization and after-treatment were carried out in the same manner as in Example 1 except that 7.1 kg of CTFE, 18.3 kg of TFE and 31.3 kg of PPVE were used as the initial charge monomers, to give 23.7 kg of a CTFE copolymer (G)

as a granular powder. At this time, the rate of polymerization lowered to 65% as compared with Example 1. The CTFE copolymer G obtained was evaluated for the same physical characteristics as in Example 2 except for the adhesion strength measurement with PTFE, which was omitted. The results are shown in Table 2.

Example 8

The polymerization and after-treatment were carried out in the same manner as in Example 1 except that PPVE was not used and that 29.3 kg of CTFE, 8.6 kg of TFE and 0.5 kg of ethylene were used as the initial charge monomers, to give 26.3 kg of a CTFE copolymer (H) as a granular powder. The CTFE copolymer H obtained was evaluated for the same physical characteristics as in Example 2 except for the MIT folding endurance and adhesion strength (with PTFE) measurements, which were omitted. The results are shown in Table 2.

Example 9

The polymerization and after-treatment were carried out in the same manner as in Example 1 except that octafluorocyclobutane and PPVE were not used and that 3.9 kg of CTFE, 20.4 kg of TFE and 202 kg of hexafluoropropylene were used as the initial charge monomers, to give 25.8 kg of a CTFE copolymer (I) as a granular powder. The CTFE copolymer I obtained was evaluated for the same physical characteristics as in Example 1 except for the MIT folding endurance and adhesion strength (with PFA, FEP and PTFE) measurements, which were omitted. The results are shown in Table 2.

Example 10

The polymerization and after-treatment were carried out in the same manner as in Example 1 except that PPVE was not used and that 19.3 kg of CTFE, 13 kg of TFE and 7.4 kg of [H2P] ($CH_2=CFCF_2CF_2CF_2H$) were used, as the initial charge monomers, to give 20.6 kg of a CTFE copolymer (J) as a granular powder.

The CTFE copolymer J obtained was evaluated for the same physical characteristics as in Example 2. The results are shown in Table 2.

Comparative Example 1

The polymerization and after-treatment were carried out in the same manner as in Example 1 except that PPVE was not used and that 2.7 kg of CTFE and 22.8 kg of TFE were used as the initial charge monomers, to give 22.4 kg of a CTFE copolymer (K) as a granular powder. The CTFE copolymer K obtained was evaluated for the same physical characteristics as in Example 1 except for the MIT folding endurance and adhesion strength (with PFA, FEP and PTFE) measurements, which were omitted. The results are shown in Table 2.

Comparative Example 2

The polymerization was carried out in the same manner as in Example 1 except that 6.6 kg of CTFE, 12.7 kg of TFE and 69.2 kg of PPVE were used as the initial charge monomers. Since, however, the rate of polymerization remarkably slowed down to 20% or less as compared with Example 2, the polymerization was discontinued after 8.2 hours. The CTFE copolymer obtained as a granular powder was subjected only to composition analysis, which confirmed that the copolymer had the desired copolymer composition. The analytical results are shown in Table 2.

Comparative Example 3

The polymerization and after-treatment were carried out in the same manner as in Example 1 except that PPVE was not used and that 21.8 kg of CTFE, 14.3 kg of TFE and 2 kg of ethylene were used as the initial charge monomers, to give 23 kg of a CTFE copolymer (L) as a granular powder. However, the CTFE copolymer L obtained had an excessively lowered melting point, so that any laminated tube could not be manufactured. The results are shown in Table 2.

Comparative Example 4

The polymerization was carried out in the same manner as in Example 1 except that octafluorocyclobutane and PPVE were not used and that 5.4 kg of CTFE, 5.8 kg of TFE and 205.1 kg of HFP were used as the initial charge monomers. Since, however, the rate of polymerization remarkably slowed down to 30% or less as compared with Example 8, the polymerization was discontinued after 8.0 hours. The CTFE copolymer obtained as a granular powder was subjected only to composition analysis, which confirmed that the copolymer had the desired copolymer composition. The analytical results are shown in Table 2.

Comparative Example 5

A jacketed mixing vessel-type polymerizer with a capacity of 174 kg of water was charged with 51 kg of demineralized pure water, and the inside space was sufficiently purged with pure nitrogen gas and then the nitrogen gas was eliminated by evacuation. Then, 35 kg of octafluorocyclobutane and 10 kg of perfluoro(methyl vinyl ether) were fed under pressure to the polymerizer, the temperature was adjusted to 35° C. and stirring was started. Then TFE was fed under pressure until arrival at 0.78 MPa. Thereto was added 0.38 kg of a 50% (by mass) methanolic solution of NPP to initiate the polymerization. During polymerization, the vessel inside pressure was maintained at 0.78 MPa while additionally feeding a monomer mixture prepared so that the composition thereof might be equal to the desired copolymer composition and, after carrying out the polymerization until arrival of the total additional charge amount at about 100% by mass relative to the solvent, the residual gases in the vessel were discharged, and the polymer formed was taken out, washed with demineralized pure water and dried to give 30 kg of a tetrafluoroethylene/perfluoro(methyl vinyl ether) copolymer [MFA] as a granular powder. The MFA obtained was evaluated for the same physical characteristics as in Example 1 except for the MIT folding endurance and adhesive strength (with PFA, FEP and PTFE) measurements, which were omitted. This MFA was not used as the outer layer material but in manufacturing a single layer tube or as the inner layer of the laminated tube comprising the CTFE copolymer having a relatively low melting point, namely B, E, G, H or J, or PCTFE. The results of the physical characteristics evaluations of the single layer tube as carried out in the same manner as in Example 1 are shown in Table 2.

Comparative Example 6

A PCTFE in pellet form (trademark: NEOFLON CTFE M300P, product of Daikin Industries) was evaluated for the same physical characteristics as in Example 1 except for the laminated tube B production and the adhesive strength measurements (with PFA, FEP and PTFE), which were omitted. The results are shown in Table 2.

Comparative Example 7

A PCTFE in pellet form (trademark: NEOFLON CTFE M300P, product of Daikin Industries) was evaluated for the same physical characteristics as in Example 2 except for the adhesive strength measurement with PTFE, which was omitted. The results are shown in Table 2.

Comparative Example 8

A tetrafluoroethylene/perfluoro(propyl vinyl ether) copolymer in pellet form (trademark: NEOFLON PFA AP231SH, product of Daikin Industries) was evaluated for the same physical characteristics as in Example 1 except for the adhesive strength measurements (with PFA, FEP and PTFE). This PFA was not used as the outer layer material but in manufacturing a single layer tube or as the inner layer of the laminated tube comprising the CTFE copolymer having a relatively high melting point, namely A, C, D, F, I or K, or PCTFE. The results of the physical characteristics evaluations of the single layer tube as carried out in the same manner as in Example 1 are shown in Table 2.

TABLE 2

| | | Sheet and single layer tube materiel or CTFE copolymer composition (mole percent) | | | | | | Physical characteristics of polymer | | | Sheet 35% (by mass) | | MIT folding endurance [×10$^4$ cycles] |
|---|---|---|---|---|---|---|---|---|---|---|---|---|---|
| | | CTFE | TFE | PPVE | Et | HFP | H2P | Thermal decomposition starting temperature [° C.] | Melting point [° C.] | MFR [g/10 min] | hydrochloric acid permeability coefficient [×10$^{-13}$ (g·cm)/ (cm$^2$·sec)] | $T_\rho$ [day] | |
| Example 1 | A | 34.5 | 64.0 | 1.5 | — | — | — | 420 | 245 | 1.6 | 0.25 | 3-30 | 198 |
| Example 2 | B | 61.6 | 37.0 | 1.4 | — | — | — | 392 | 199 | 11 | 0.07 | 3-30 | 2.1 |
| Example 3 | C | 24.7 | 73.0 | 2.3 | — | — | — | 430 | 246 | 1.0 | 0.68 | 3-30 | 245 |
| Example 4 | D | 12.4 | 86 | 1.6 | — | — | — | 442 | 282 | 3.5 | 0.98 | 3-30 | >250 |
| Example 5 | E | 87 | 11.5 | 1.5 | — | — | — | 382 | 195 | 9 | 0.05 | 3-30 | — |
| Example 6 | F | 35.1 | 64.5 | 0.4 | — | — | — | 410 | 255 | 1.3 | 0.29 | 3-30 | 45 |
| Example 7 | G | 31.7 | 63.6 | 4.7 | — | — | — | 383 | 206 | 4.3 | 0.42 | 3-30 | >250 |
| Example 8 | H | 68.7 | 22 | — | 9.3 | — | — | 370 | 172 | 8.0 | 0.09 | 3-30 | — |
| Example 9 | I | 17.5 | 73 | — | — | 9.5 | — | 395 | 225 | 14 | 0.80 | 3-30 | — |
| Example 10 | J | 61.1 | 37.4 | — | — | — | 1.5 | 392 | 202 | 12 | 0.06 | 3-30 | >250 |
| Comp. Example 1 | K | 29.7 | 70.3 | — | — | — | — | 416 | 258 | 0.8 | 0.51 | 3-30 | — |
| Comp. Example 2 | | 34.5 | 52.5 | 13 | — | — | — | — | — | — | — | — | — |
| Comp. Example 3 | L | 52.9 | 17.1 | — | 30 | — | — | 348 | 140 | 18 | 0.97 | 3-30 | — |
| Comp. Example 4 | | 38 | 44 | — | — | 18 | — | — | — | — | — | — | — |
| Comp. Example 5 | | | | MFA | | | | 433 | 224 | 6.8 | 5.85 | 2-6 | — |
| Comp. Example 6 | | | | PCTFE | | | | 362 | 213 | — | 0.03 | 3-30 | 0.02 |
| Comp. Example 7 | | | | PCTFE | | | | 362 | 213 | — | 0.03 | 3-30 | 0.02 |
| Comp. Example 8 | | | | PFA | | | | 473 | 304 | 2.1 | 6.20 | 2-6 | >250 |

| | | Laminated tube A | | | | | | Laminated tube B | |
|---|---|---|---|---|---|---|---|---|---|
| | | 35% (by mass) hydrochloric acid permeability coefficient [×10$^{-13}$ (g·cm)/ (cm$^2$·sec)] | $T_\rho$ [day] | Adhesion strength with PFA [N/cm] | Adhesion strength with FEP [N/cm] | Adhesion strength with PTFE [N/cm] | Percent change in specific gravity [%] | 35% (by mass) hydrochloric acid permeability coefficient [×10$^{-13}$ (g·cm)/ (cm$^2$·sec)] | $T_\rho$ [day] |
| Example 1 | A | 0.85 | 3-50 | 21 | 24 | — | 0 | 0.89 | 3-50 |
| Example 2 | B | 0.29 | 3-50 | — | — | 38 | 0 | 0.48 | 3-50 |
| Example 3 | C | 1.07 | 3-50 | 30 | 43 | — | 0 | 0.98 | 3-50 |
| Example 4 | D | 2.89 | 3-50 | 38 | 48 | — | 1 | — | — |
| Example 5 | E | 0.22 | 3-50 | — | — | — | −2 | 0.53 | 3-50 |
| Example 6 | F | 1.03 | 3.50 | — | — | — | 0 | 2.79 | 3-50 |
| Example 7 | G | 1.95 | 3-50 | — | — | — | −4 | 1.83 | 3-50 |
| Example 8 | H | 1.03 | 3-50 | — | — | — | −6 | 2.26 | 3-50 |
| Example 9 | I | 2.58 | 3-50 | — | — | — | −3 | 2.79 | 3-50 |
| Example 10 | J | 0.29 | 3-50 | — | — | 35 | 0 | 0.38 | 3-50 |
| Comp. Example 1 | K | 2.18 | 3-50 | — | — | — | 0 | 5.9 | 3-20 |
| Comp. Example 2 | | — | — | — | — | — | — | — | — |
| Comp. Example 3 | L | — | — | — | — | — | — | — | — |
| Comp. Example 4 | | — | — | — | — | — | — | — | — |

TABLE 2-continued

| | | | | | | | |
|---|---|---|---|---|---|---|---|
| Comp. Example 5 | 5.92 (Single layer) | 3-20 | — | — | — | 0 | 6.14 (Single layer) | 3-20 |
| Comp. Example 6 | 6.27 | 3-20 | — | — | — | −74 | — | — |
| Comp. Example 7 | 0.35 | 3-50 | — | — | — | −5 | 5.28 | 3-20 |
| Comp. Example 8 | 6.21 (Single layer) | 3-20 | — | — | — | 0 | 6.11 (Single layer) | 3-20 |

| | | Laminated tube A manufacturing conditions | | | | | | |
|---|---|---|---|---|---|---|---|---|
| | | | Cylinder temperature | | Die | Tube take- | Each layer thickness | |
| | | Inner layer material | Outer layer [° C.] | Inner layer [° C.] | temperature [° C.] | off speed [m/min] | Outer layer [mm] | Inner layer [mm] |
| Example 1 | A | PFA | 330 | 380 | 395 | 0.5 | 0.20 | 1.40 |
| Example 2 | B | MFA | 280 | 270 | 290 | 0.5 | 0.20 | 1.39 |
| Example 3 | C | PFA | 330 | 380 | 395 | 0.5 | 0.20 | 1.40 |
| Example 4 | D | PFA | 380 | 380 | 395 | 0.5 | 0.21 | 1.39 |
| Example 5 | E | MFA | 280 | 270 | 290 | 0.5 | 0.20 | 1.40 |
| Example 6 | F | PFA | 360 | 380 | 395 | 0.5 | 0.20 | 1.38 |
| Example 7 | G | MFA | 290 | 270 | 290 | 0.5 | 0.20 | 1.39 |
| Example 8 | H | MFA | 260 | 270 | 290 | 0.5 | 0.20 | 1.38 |
| Example 9 | I | PFA | 320 | 380 | 395 | 0.5 | 0.20 | 1.38 |
| Example 10 | J | MFA | 280 | 270 | 290 | 0.5 | 0.20 | 1.39 |
| Comp. Example 1 | K | PFA | 340 | 380 | 395 | 0.5 | 0.23 | 1.38 |
| Comp. Example 2 | | — | — | — | — | — | — | — |
| Comp. Example 3 | L | — | — | — | — | — | — | — |
| Comp. Example 4 | | — | — | — | — | — | — | — |
| Comp. Example 5 | | MFA | — | 270 | 290 | 0.5 | 0.21 | 1.39 |
| Comp. Example 6 | | PFA | 290 | 380 | 395 | 0.5 | 0.2 | 1.37 |
| Comp. Example 7 | | MFA | 290 | 270 | 290 | 0.5 | 0.21 | 1.39 |
| Comp. Example 8 | | PFA | — | 380 | 395 | 0.5 | — | 1.59 |

Among the physical characteristics evaluation results shown in Table 2, the hydrochloric acid permeability coefficients of the film sheets as shown are those hydrochloric acid permeability coefficients for the film sheets molded under relatively mild molding temperature conditions, namely at a temperature higher by 50 to 70° C. than the melting point of each CTFE copolymer, PFA, MFA or PCTFE, and the permeability coefficients of the CTFE copolymer or PCTFE film sheets are about ⅙ to 1/100 of the coefficient of the PFA or MFA single layer sheet, indicating that they are evidently superior from the low chemical liquid permeability viewpoint. It was found that a copolymer composition higher in CTFE content tends to show a lower permeability coefficient. Now, the laminated tube A evaluation results are discussed. It was found that by lamination of an about 1.4-mm-thick PFA layer or MFA layer with only an about 0.2-mm-thick layer of one of the CTFE copolymers A to J, it is possible to provide the PFA or MFA layer with excellent low liquid chemical permeability, namely ½ to 1/50 permeability as compared with the PFA single layer tube. However, it was found that while the PCTFE used in Comparative Example 6, in the film sheet form, was very excellent from the low liquid chemical permeability viewpoint, the low liquid chemical permeability providing effect of the PCTFE could not be produced at all in the laminated tube A obtained by lamination with PFA. Upon visual observation, foaming was detected in the outer layer. From the changes in specific gravity, this was estimated to be due to thermal decomposition the PCTFE, which has a decomposition starting temperature of 362° C., and to foaming in the layer thereof as a result of exposure thereof to such a high temperature as the die temperature of 395° C. required for molding of the PFA in the coextrusion processes in the Examples and Comparative Examples. Therefore, in Comparative Example 7, the PCTFE was coextruded with the MFA, which has a lower maximum molding temperature; it was found that the laminated tube A obtained showed a satisfactory low level of liquid chemical permeability comparable to that of the CTFE copolymer mentioned above.

Further, the laminated tubes B obtained by dynamic stress application to the laminated tubes A were tested for outer layer stress cracking. Liquid chemical feeding tubes, for instance, are exposed to various stresses in the practical use thereof, so that it is important for the laminated tubes to have an outer layer sufficiently resistant to stress cracking. The stress is, for example, the internal pressure exerted by the liquid chemical during transfer. If a laminated tube B retains the permeability coefficient of the corresponding laminated tube A, the outer layer can be judged to have good stress cracking resistance. In the above-mentioned Comparative Example 7, the PCTFE, when evaluated as laminated tube A, was found to have a satisfactorily low liquid chemical permeability. However, in the form of laminated tube B, it showed a sharp increase in permeability coefficient and, thus, the low liquid chemical permeability of the PCTFE itself could not be displayed as compared with the MFA single layer. This was due to cracking of the PCTFE outer layer as caused by repeated dynamic stress application. Upon visual observation, the surface layer showed signs of whitening.

On the contrary, the laminated tubes B comprising the CTFE copolymers described in the Examples all maintained the permeability coefficient levels of the corresponding laminated tubes A; thus, the low liquid chemical permeability of each CTFE copolymer was satisfactorily manifested. It was thus revealed that the CTFE copolymers of the invention are clearly improved in stress cracking resistance as compared with the PCTFE.

For attaining an improvement in stress cracking resistance, it is important that an appropriate amount of PPVE, for instance, be copolymerized. It was revealed that, without using PPVE, for instance, the stress cracking resistance decreases, as found in Comparative Example 1, and, when the amount is excess, as in Comparative Example 2, the rate of polymerization markedly decreases, whereby the productivity is reduced.

It was revealed that the adhesion between the CTFE copolymer of the invention and PFA or FEP tends to become improved as the CTFE unit mole percent in the CTFE copolymer of the invention decreases. It was found that, when the CTFE unit mole percent was not higher than 35 mole percent, in particular, good adhesion was obtained and, when it was not higher than 30 mole percent, still better adhesion was attained. These results indicate that when firm interlayer adhesion is required according to the intended use, it is possible to attain both satisfactory permeability coefficient and good adhesiveness simultaneously when the CTFE unit mole percent is adequately selected within the above range.

The CTFE copolymer of the invention, which has the constitution described hereinabove, can give molded articles having good stress cracking resistance and low liquid chemical permeability simultaneously and, further, having chemical resistance and that thermal stability which is required in the step of molding.

INDUSTRIAL APPLICABILITY

The CTFE copolymer of the invention can be suitably used as a molding material for producing tubes showing low liquid chemical permeability and, in particular, is suited for use as a molding material which can be coextruded with a thermoplastic resin having a high melting point to produce tubes showing low liquid chemical permeability.

EXPLANATION OF SYMBOLS

Figure 1:
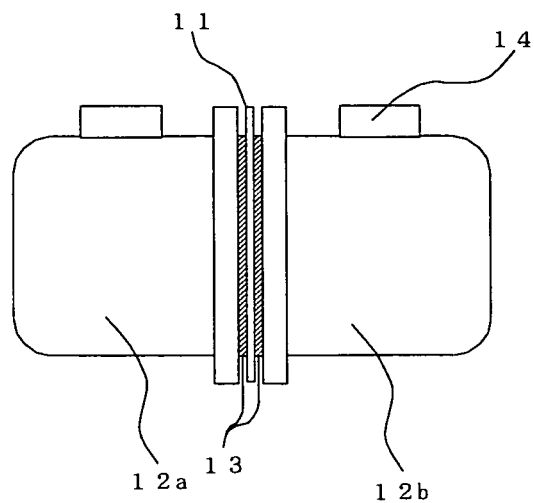
FIG. 1 This figure is a schematic representation of the experimental apparatus used in testing sheets for 35% (by mass) hydrochloric acid permeability.
Figure 2:
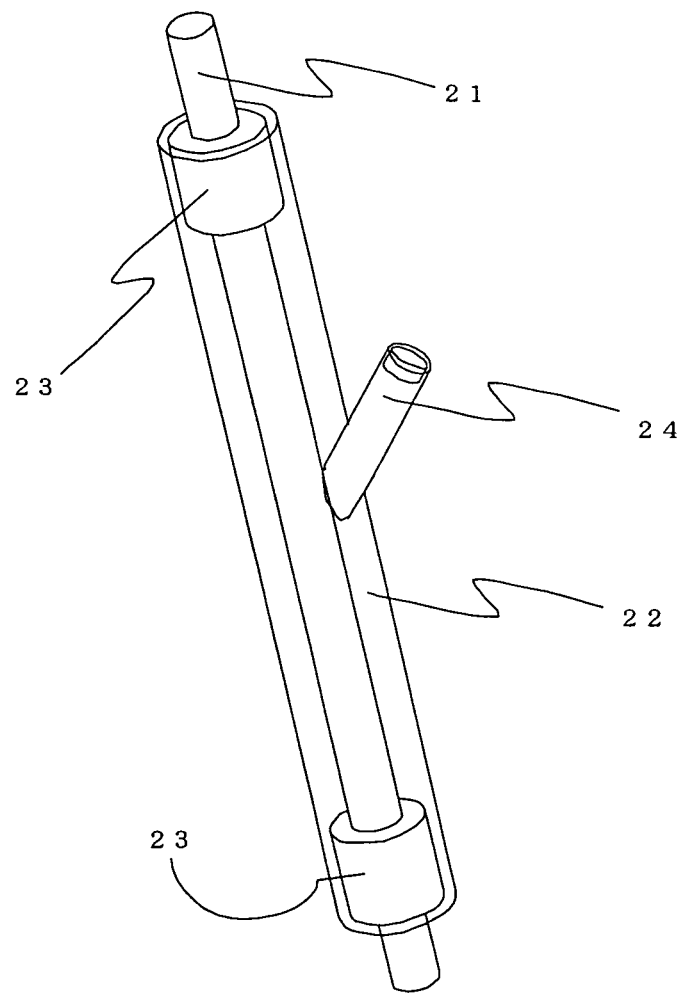
FIG. 2 This figure is a schematic representation of the experimental apparatus used in testing tubes for 35% (by mass) hydrochloric acid permeability.

11—Sample sheet
12a—Glass container (containing 35% (by mass) hydrochloric acid)
12b—Glass container (containing pure water)
13—O-ring
14—Sampling opening
21—Tube
22—Glass tube
23—Packing
24—Sampling opening

The invention claimed is:

1. A chlorotrifluoroethylene copolymer constituted which consists of chlorotrifluoroethylene unit, tetrafluoroethylene unit and a monomer (A) unit derived from a monomer (A) copolymerizable with chlorotrifluoroethylene and tetrafluoroethylene,
   wherein the sum of said chlorotrifluoroethylene unit and said tetrafluoroethylene unit amounts to 90 to 99.9 mole % and
   said monomer (A) unit amounts to 0.1 to 10 mole %,
   when the monomer (A) is a PAVE, the monomer (A) unit amounts to not less than 0.5 mole %,
   wherein the chlorotrifluoroethylene unit amounts to 12.6 to 62.5 mole % of the sum of said chlorotrifluoroethylene unit and the tetrafluoroethylene unit,
   wherein the temperature (Tx) required for causing decomposition of 1% by mass of said chlorotrifluoroethylene copolymer is not lower than 370° C.,
   wherein said chlorotrifluoroethylene copolymer has a melting point (Tm) of 150 to 300° C., and
   wherein the monomer (A) is at least one monomer selected from the group consisting of ethylene, vinylidene fluoride, a perfluoro(alkyl vinyl ether) and a vinyl monomer represented by the general formula (I):

$$CX^3X^4=CX^1(CF_2)_n\text{-}X^2 \quad (I)$$

wherein $X^1$, $X^3$ and $X^4$ are the same or different and each represents hydrogen atom or fluorine atom, $X^2$ represents hydrogen atom, fluorine atom or chlorine atom and n represents an integer of 1 to 10.

2. The chlorotrifluoroethylene copolymer according to claim 1,
   wherein the monomer (A) is a perfluoro(alkyl vinyl ether) represented by the general formula (II):

$$CF_2=CF-ORf^1 \quad (II)$$

wherein $Rf^1$ represents a perfluoroalkyl group containing 1 to 8 carbon atoms.

3. The chlorotrifluoroethylene copolymer according to claim 1,
   wherein the chlorotrifluoroethylene unit amounts to 15 to 55 mole % of the sum of said chlorotrifluoroethylene unit and the tetrafluoroethylene unit.

4. The chlorotrifluoroethylene copolymer according to claim 1,
   which has a melt flow rate of 0.1 to 70 g/10 minutes.

5. A molded article obtained by using the chlorotrifluoroethylene copolymer according to claim 1.

6. The molded article according to claim 5 which is a fluid transfer member.

7. The chlorotrifluoroethylene copolymer according to claim 1,
   wherein the sum of said chlorotrifluoroethylene unit and said tetrafluoroethylene unit amounts to 90 to 98.6 mole % and
   said monomer (A) unit amounts to 1.4 to 10 mole %.

8. The chlorotrifluoroethylene copolymer according to claim 1,
   wherein the sum of said chlorotrifluoroethylene unit and said tetrafluoroethylene unit amounts to 90 to 98.6 mole % and
   said monomer (A) unit amounts to 1.4 to 10 mole %.

* * * * *